(12) United States Patent
Shibuya et al.

(10) Patent No.: US 10,598,961 B2
(45) Date of Patent: Mar. 24, 2020

(54) GLASSES

(71) Applicant: ELCYO CO., LTD., Osaka (JP)

(72) Inventors: Giichi Shibuya, Minoh (JP); Sunri Lee, Osaka (JP); Yumi Atobe, Nagoya (JP)

(73) Assignee: ELCYO CO., LTD., Osaka (JP)

(*) Notice: Subject to any disclaimer, the term of this patent is extended or adjusted under 35 U.S.C. 154(b) by 0 days.

(21) Appl. No.: 16/005,921

(22) Filed: Jun. 12, 2018

(65) Prior Publication Data
US 2018/0356652 A1     Dec. 13, 2018

(30) Foreign Application Priority Data
Jun. 13, 2017 (JP) ................. 2017-116058

(51) Int. Cl.
| G02C 11/00 | (2006.01) |
| G02B 5/30 | (2006.01) |
| G02F 1/13 | (2006.01) |
| G02B 27/00 | (2006.01) |
| G02C 7/08 | (2006.01) |
| G02F 1/29 | (2006.01) |

(52) U.S. Cl.
CPC ............ G02C 11/10 (2013.01); G02B 5/3016 (2013.01); G02B 27/0093 (2013.01); G02C 7/083 (2013.01); G02F 1/1313 (2013.01); G02C 2202/20 (2013.01); G02F 2001/294 (2013.01)

(58) Field of Classification Search
CPC .. G02B 5/3016; G02B 27/0093; G02C 11/10; G02C 7/083; G02C 2202/20; G02F 1/1313; G02F 2001/294

USPC .......................................................... 349/13
See application file for complete search history.

(56) References Cited

U.S. PATENT DOCUMENTS

| 7,553,019 | B2 | 6/2009 | Kuiper et al. |
| 2006/0244902 | A1 | 11/2006 | Kuiper et al. |
| 2011/0285959 | A1 | 11/2011 | Gupta et al. |
| 2014/0253832 | A1* | 9/2014 | Lee .................. G02F 1/133788 349/15 |
| 2015/0316778 | A1* | 11/2015 | Smith .................. H04N 13/312 349/15 |
| 2017/0003519 | A1* | 1/2017 | Burkert .................. G02C 7/083 |
| 2018/0031947 | A1 | 2/2018 | Shibuya et al. |

FOREIGN PATENT DOCUMENTS

| JP | 2000-249902 A | 9/2000 |
| JP | 2007-519016 A | 7/2007 |
| JP | 2009-237212 A | 10/2009 |
| JP | 2011-017742 A | 1/2011 |
| JP | 2011-099999 A | 5/2011 |
| JP | 2011-180373 A | 9/2011 |
| JP | 2012-137682 A | 7/2012 |
| JP | 2013-526728 A | 6/2013 |

(Continued)

*Primary Examiner* — Nathanael R Briggs
*Assistant Examiner* — William D Peterson
(74) *Attorney, Agent, or Firm* — Studebaker & Brackett PC

(57) ABSTRACT

Glasses controls light that is to enter an eye. The glasses includes an optical element and a control section. The optical element includes a liquid crystal layer that refracts the light. The control section controls refraction of the light by forming an electric potential gradient in a saw-tooth shape in the liquid crystal layer through application of control voltage to the liquid crystal layer.

16 Claims, 21 Drawing Sheets

(56) References Cited

FOREIGN PATENT DOCUMENTS

| JP | 2014-006440 A | 1/2014 |
| JP | 2017-015757 A | 1/2017 |
| JP | 6128719 B | 5/2017 |
| WO | 2016/117604 A1 | 7/2016 |
| WO | 2018/016390 A1 | 1/2018 |

* cited by examiner

GLASSES

BACKGROUND

The present invention relates to glasses that control light that is to enter an eye.

Glasses disclosed in a document (Japanese Patent Application Laid-Open Publication No. 2000-249902) adjust focal points through detection of line-of-sight directions of respective eyes. Specifically, the glasses include a line-of-sight direction detector and variable focus lenses each capable of changing a focal length. The glasses adjust a focal point of each variable focus lens according to a line-of-sight direction signal from the line-of-sight direction detector.

Each of the variable focus lenses has a mechanical focus adjusting mechanism. Specifically, the variable focus lens includes two transparent plate-shaped objects, a transparent body, and an actuator. The transparent body is a deformable fluid having a refractive index different from that of the air. The transparent body is disposed between the two plate-shaped objects to fill a space therebetween. The actuator changes each shape of the transparent body and the two plate-shaped objects. In the above configuration, a refraction state of light passing through the two plate-shaped objects changes, with a result that the focus is adjusted.

SUMMARY

According to one aspect of the present invention, glasses controls light that is to enter an eye. The glasses include an optical element and a control section. The optical element includes a liquid crystal layer that refracts the light. The control section controls refraction of the light by forming an electric potential gradient in a saw-tooth shape in the liquid crystal layer through application of control voltage to the liquid crystal layer.

DETAILED DESCRIPTION

Figure 1:
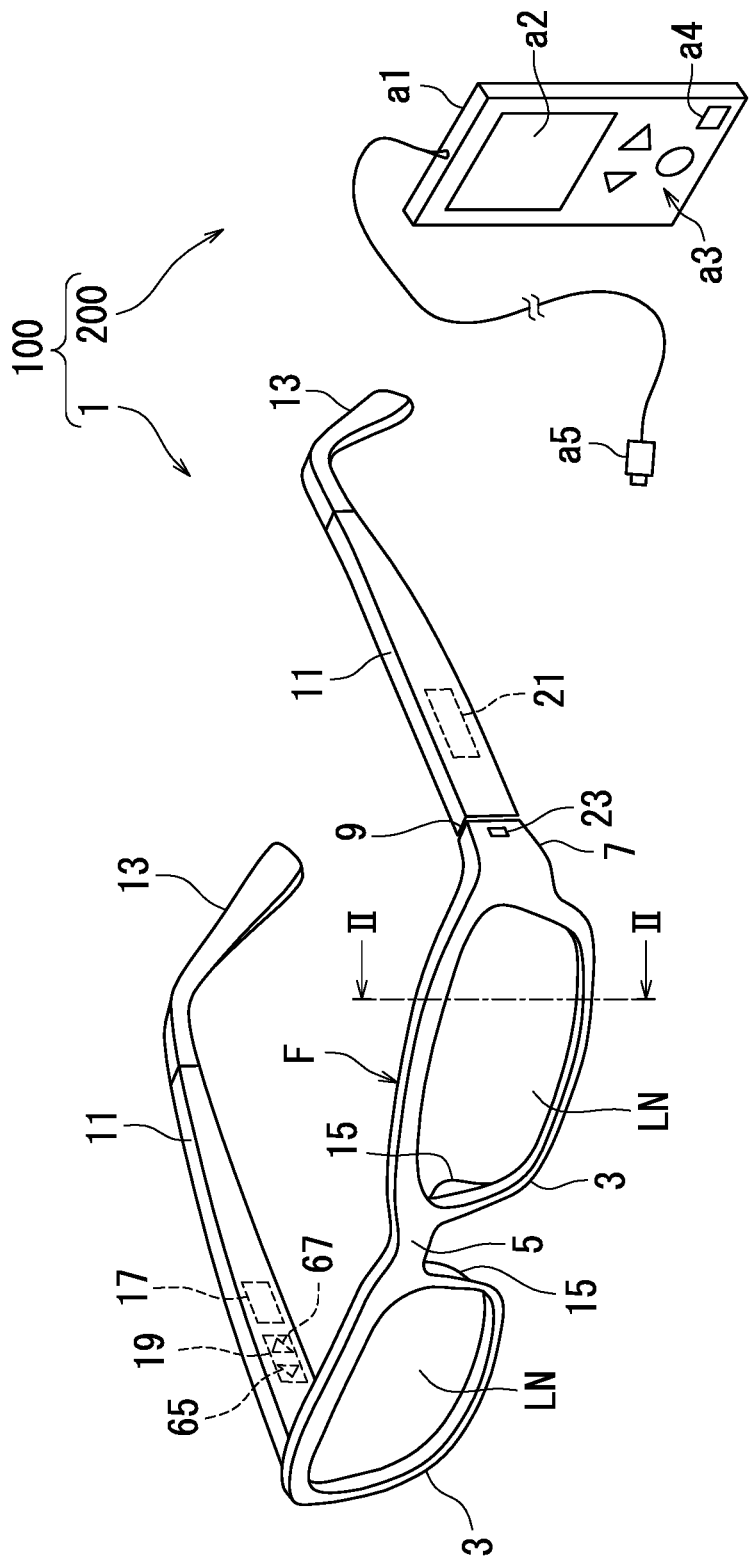
FIG. 1 is a perspective view illustrating an eyeglass system according to a first embodiment of the present invention.

Embodiments of the present invention will be described below with reference to the accompanying drawings. Note that elements that are the same or equivalent are indicated by the same reference signs in the drawings and explanation thereof is not repeated. Also, hatching indicating a section is omitted as appropriate for the sake of simplicity of illustration.

(First Embodiment)

The following describes an eyeglass system 100 according to a first embodiment of the present invention with reference to FIGS. 1 to 8. FIG. 1 is a perspective view illustrating the eyeglass system 100. As illustrated in FIG. 1, the eyeglass system 100 includes glasses 1 and an operation device 200. The operation device 200 includes a main body a1 and a terminal a5, and is connectable to the glasses 1.

The glasses 1 control light that is to enter eyes of a wearer HM wearing the glasses 1. The glasses 1 includes a frame F, a pair of optical elements LN, a control section 17, an operation section 19, a battery 21, and a terminal 23. The optical elements LN each function as a lens.

The frame F holds the optical elements LN. The control section 17, the operation section 19, the battery 21, and the terminal 23 are mounted on the frame F.

Specifically, the frame F may include a pair of rims 3, a bridge 5, a pair of end pieces 7, a pair of hinges 9, a pair of temples 11, a pair of temple tips 13, and a pair of nose pads 15. The rims 3 hold the respective optical elements LN. The bridge connects one of the rims 3 to the other of the rims 3. The end pieces 7 are located at ends of the respective rims 3 that each are located outward of the bridge 5. The end pieces 7 each connect a corresponding one of the rims 3 to a corresponding one of the temples 11 through a corresponding one of the hinges 9. The hinges 9 each support a corresponding one of the temples 11 pivotally about a corresponding one of the end pieces 7. The temples 11 catch the head of the wearer HM. The temple tips 13 cover tip end regions of the respective temples 11 and come in contact with upper parts of the respective ears of the wearer HM.

Each of the optical elements LN functions as a convex lens by converging light or a concave lens by diverging light under control by the control section 17. The control section 17 controls the optical elements LN based on an internal operation signal from the operation section 19 or an external operation signal from the operation device 200. The operation section 19 transmits the internal operation signal according to operation by the wearer HM to the control section 17. The control section 17 and the operation section 19 are disposed for example at one of the temples 11. The battery 21 supplies source voltage to the control section 17 and the operation section 19. The battery 21 is disposed for example at the other temple 11. The terminal 23 is connectable to the terminal a5 of the operation device 200. The terminal 23 is disposed for example at one of the end pieces 7.

A part of the frame where the battery 21 is accommodated is preferably made of a material more excellent in thermal resistance than a material of the other part of the frame F. The battery 21 may have a function of preventing burnout in order to further increase safety. For example, a temperature sensor may be provided in the vicinity of the battery 21 and a switch may be provided to cut electronic circuits constituting the control section 17 when a sensed temperature exceeds a preset temperature. A non-contact charging mechanism may be provided in the vicinity of the battery 21.

The battery 21 may be charged through a lead wire or by a non-contact scheme. A casing of the glasses 1 may have either or both a non-contact charting function and a charging function using the lead wire, and the glasses 1 may be charged once accommodated into the casing of the glasses 1. Either or both the casing of the glasses 1 and the glasses 1 may be provided with a solar cell for auxiliary charging.

The operation device 200 transmits the external operation signal according to operation by the wearer HM to the control section 17 via the terminals a5 and 23. Specifically, the main body a1 of the operation device 200 further includes a display a2, an operation key a3, and a speaker a4. The display a2 displays an image. The operation key a3 receives operation by the wearer HM. The main body a1 (specifically, a processor of the main body a1) transmits the external operation signal according to operation on the operation key a3 to the control section 17. The speaker a4 outputs sound. The terminal a5 is attachable to and detachable from the terminal 23 of the glasses 1. The operation device 200 may be for example a terminal dedicated for the glasses 1 or a mobile terminal such as a smartphone.

The operation device 200 may have a size for example small enough to be put into a card holder. Because, the operation device 200 may be put into the card holder for use in a situation in which the glasses 1 are worn with the operation device 200 connected thereto all the time. In FIG. 1, the operation device 200 has a substantially rectangular shape having a surface corresponding to a short side thereof and a terminal (also referred to below as a "terminal TL") is provided at the surface. A cable extends from the terminal TL to the terminal a5. In a configuration in which the terminal TL is provided at the surface corresponding to the short side of the operation device 200, it is convenient to put the operation device 200 into a portrait card holder. However, the position of the terminal TL is not particularly limited and the terminal TL may be provided for example at a surface corresponding to a long side of the operation device 200. In a configuration in which the terminal TL is provided at the surface corresponding to the long side of the operation device 200, it is convenient to put the operation device 200 into a landscape card holder.

The position of the terminal 23 of the glasses 1 is not also particularly limited. Assuming for example that the glasses 1 are worn with the operation device 200 connected thereto all the time (e.g., in a case where the glasses 1 are used as glasses for cataract or presbyopia), the terminal 23 of the glasses 1 may be provided at a tip end surface of one of the temples 11 (tip end surface of one of the temple tips 13). For example, in a case where the wearer HM is a right-hander, it is preferable to provide the terminal 23 of the glasses 1 at a tip end surface of a left temple 11 (tip end surface of a left temple tip 13) for the wearer HM.

Figure 2:
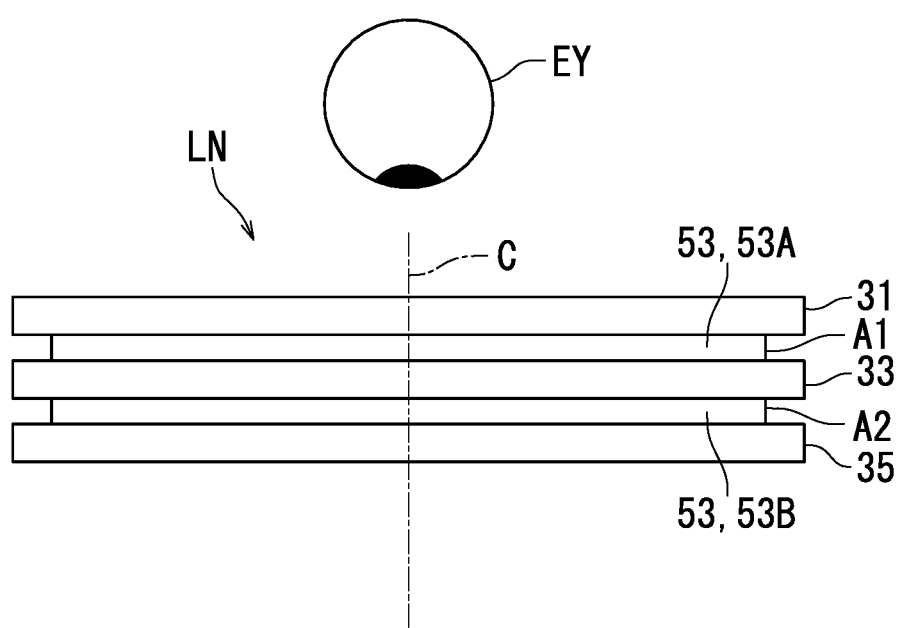
FIG. 2 is a schematic cross-sectional view of an optical element taken along a line II-II in FIG. 1.

The following describes the optical elements LN with reference to FIG. 2. FIG. 2 is a schematic cross-sectional view of one of the optical elements LN taken along a line II-II in FIG. 1. As illustrated in FIG. 2, each of the optical elements LN includes a first substrate 31, a first liquid crystal unit A1, a second substrate 33, a second liquid crystal unit A2, and a third substrate 35. The first liquid crystal unit A1 is opposite to one of eyes EY of the wearer HM with the first substrate 31 therebetween. The first to third substrates 31, 33, and 35 each have a flat plate shape, and are made of for example glass or synthetic resin. The first to third substrates 31, 33, and 35 each are transparent or translucent. In the present specification, the term transparency refers to both colorless transparency and colored transparency. The first to third substrates 31, 33, and 35 may be each constituted by a single substrate or a plurality of substrates. For example, the second substrate 33 may be a plurality of substrates bonded together. Alternatively, for example, the first and third substrates 31 and 35 may have a surface in contact with the air to which anti-reflection coating is provided.

The first liquid crystal unit A1 is disposed between the first and second substrates 31 and 33. The first liquid crystal unit A1 includes a liquid crystal layer 53 (also referred to below as a "liquid crystal layer 53A"). The liquid crystal layer 53A refracts light in response to application of control voltage CV. As a result, the liquid crystal layer 53A converges or diverges the light. In the first embodiment, the control voltage CV includes first voltage V1 and second voltage V2.

The second liquid crystal unit A2 is disposed between the second and third substrates 33 and 35. The second liquid crystal unit A2 faces the first liquid crystal unit A1 with the second substrate 33 therebetween. The second liquid crystal unit A2 includes a liquid crystal layer 53 (also referred to below as a "liquid crystal layer 53B"). The liquid crystal layer 53B refracts light in response to application of control voltage CV. As a result, the liquid crystal layer 53B converges or diverges the light.

The liquid crystal layers 53A and 53B each contain liquid crystals. For example, the liquid crystals are nematic liquid crystals. The liquid crystals are homogenously aligned in an environment with no electric field in which the control voltage CV is not applied to the liquid crystal layers 53. The liquid crystals are transparent, for example.

Specifically, a direction in which the liquid crystals of the liquid crystal layer 53A are aligned is substantially perpendicular in a plan view to a direction in which the liquid crystals of the liquid crystal layer 53B are aligned. The plan view refers to a view of an optical element LN in a direction in which an optical axis C of the optical element LN extends. For example, a rubbing direction of an alignment material relative to the liquid crystals of the liquid crystal layer 53A is substantially perpendicular to a rubbing direction of an alignment material relative to the liquid crystals of the liquid crystal layer 53B. The liquid crystal layers 53A and 53B are different from each other in alignment direction of the liquid crystals but are the same as each other in the other aspects.

Provision of the liquid crystal layers 53A and 53B can achieve effective refraction of incident light entering the optical element LN.

Specifically, one polarized component (also referred to below as a "polarized component PA") of a p polarized component and an s polarized component of light is refracted by the liquid crystal layer 53A to which the control voltage CV is applied while the other polarized component (also referred to below as a "polarized component PB") travels straight in the liquid crystal layer 53A. For the liquid crystal layer 53A, the polarized component PA is extraordinary light and the polarized component PB is ordinary light.

The polarized components PA and PB exiting from the liquid crystal layer 53A enter the liquid crystal layer 53B. In the liquid crystal layer 53B to which the control voltage is applied, the polarized component PA travels straight and the polarized component PB is refracted by the liquid crystal layer 53B. Because, the alignment direction of the liquid crystals of the liquid crystal layer 53A is substantially perpendicular to the alignment direction of the liquid crystals of the liquid crystal layer 53B. For the liquid crystal layer 53B, the polarized component PA is ordinary light and the polarized component PB is extraordinary light.

In the above configuration, both the p polarized component and the s polarized component of the light can be refracted, with a result that the light entering the optical elements LN can be effectively refracted.

The following describes an electric potential gradient formed in the liquid crystal layer 53 with reference to FIGS. 1 to 3D. As illustrated in FIGS. 1 and 2, the control section 17 controls refraction of light by forming an electric potential gradient in a saw-tooth shape in each of the liquid crystal layers 53A and 53B through application of the control voltage CV to each of the liquid crystal layers 53A and 53B. That is, the control section 17 controls focal lengths of the respective liquid crystal layers 53A and 53B by forming an electric potential gradient in a saw-tooth shape in each of the liquid crystal layers 53A and 53B through application of the control voltage CV to each of the liquid crystal layers 53A and 53B.

The control voltage CV applied to liquid crystal layer 53A is substantially (almost) equal to that applied to the liquid crystal layer 53B. Therefore, a frequency, waveforms, and an effective value of the control voltage CV applied to the liquid crystal layer 53A are substantially (almost) equal to those of the control voltage CV applied to the liquid crystal layer 53B. In the above configuration, the electric potential gradient formed in the liquid crystal layer 53A is substantially (almost) the same as that formed in the liquid crystal layer 53B. However, the control voltage CV and another parameter may differ between the liquid crystal layers 53A and 53B in order to finely adjust effects of light refraction derived from difference between a distance from a corresponding one of the eyes EY to the liquid crystal layer 53A along the optical axis C and a distance from the eye EY to the liquid crystal layer 53B along the optical axis C.

Figure 3A:
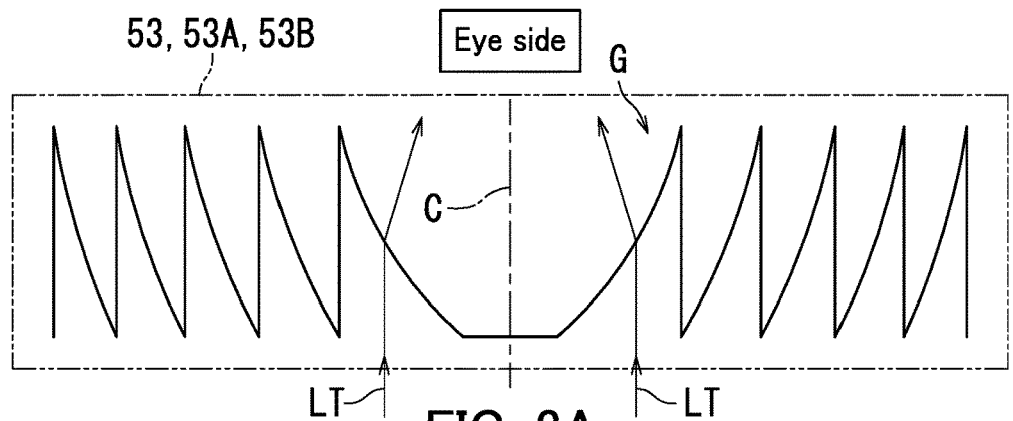
FIG. 3A is a diagram illustrating an electric potential gradient in a liquid crystal layer when the optical element according to the first embodiment functions as a convex lens.
Figure 3B:
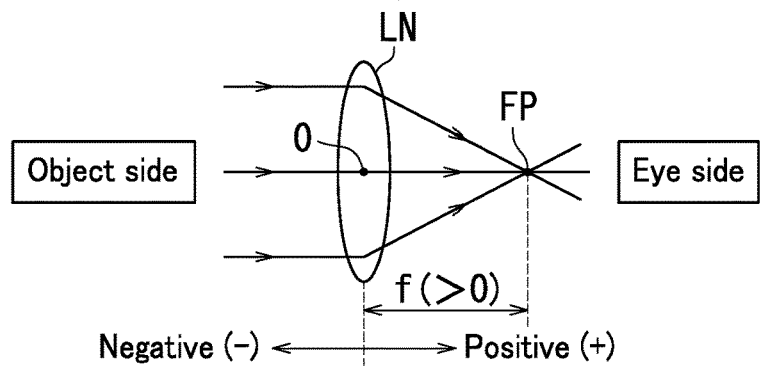
FIG. 3B is a diagram illustrating a focal length when the optical element according to the first embodiment functions as a convex lens.
Figure 3C:
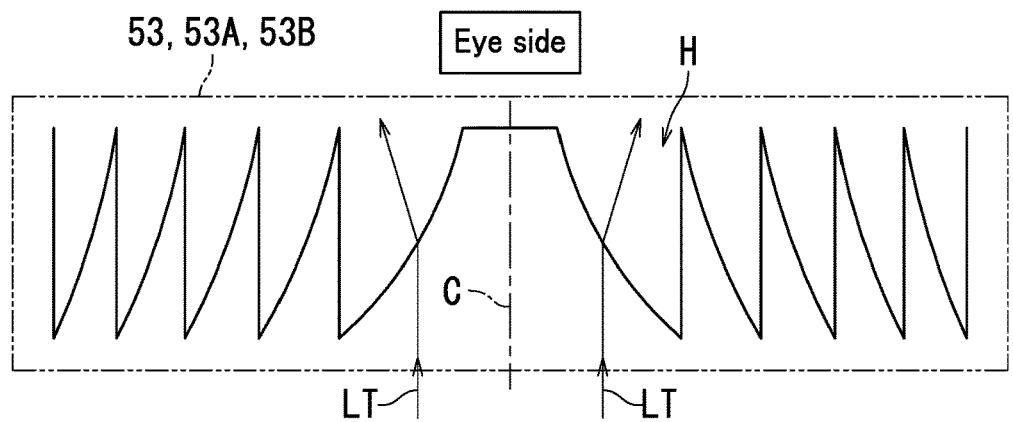
FIG. 3C is a diagram illustrating an electric potential gradient in the liquid crystal layer when the optical element according to the first embodiment functions as a concave lens.
Figure 3D:
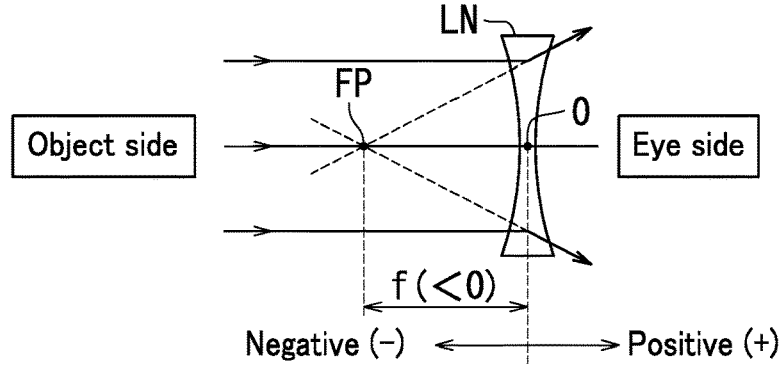
FIG. 3D is a diagram illustrating a focal length when the optical element according to the first embodiment functions as a concave lens.

FIG. 3A is a diagram illustrating an electric potential gradient G in the liquid crystal layer 53 when the optical element LN functions as a convex lens. FIG. 3B is a diagram illustrating a focal length f of the optical element LN functioning as a convex lens. Note that although FIG. 3B illustrates the optical element LN having a shape similar to that of a glass-made convex lens for the sake of easy understanding, the shape of the optical element LN does not change. FIG. 3C is a diagram illustrating an electric potential gradient H in the liquid crystal layer 53 when the optical element LN functions as a concave lens. FIG. 3D is a diagram illustrating a focal length f of the optical element LN functioning as a concave lens. Note that although FIG. 3D illustrates the optical element LN having a shape similar to that of a glass-made convex lens for the sake of easy understanding, the shape of the optical element LN does not change.

As illustrated in FIG. 3A, the electric potential gradient G in a saw-tooth shape is formed in the liquid crystal layer 53 in response to application of the control voltage CV for implementation of a convex lens. As a result, the liquid crystal layer 53 functions as a convex lens (specifically a convex Fresnel lens). That is, the optical element LN functions as a convex lens. For example, light rays LT entering the liquid crystal layer 53 in a direction substantially perpendicular to the liquid crystal layer 53 are refracted toward the optical axis C according to the electric potential gradient G to be converged.

As illustrated in FIG. 3B, when the optical element LN functions as a convex lens, the value of the focal length f of the optical element LN is positive. That is, when a focal point FP of the optical element LN is located on a side of the eye EY of the wearer HM relative to the optical element LN, the value of the focal length f is positive. The focal length f refers to a distance from a center O of the optical element LN to the focal point FP.

As illustrated in FIG. 3C, the electric potential gradient H in a saw-tooth shape is formed in the liquid crystal layer 53 in response to application of the control voltage CV for implementation of a concave lens. As a result, the liquid crystal layer 53 functions as a concave lens (specifically a concave Fresnel lens). That is, the optical element LN functions as a concave lens. For example, the light rays LT entering the liquid crystal layer 53 in a direction substantially perpendicular to the liquid crystal layer 53 are refracted away from the optical axis C according to the electric potential gradient H to be diverged.

As illustrated in FIG. 3D, when the optical element LN functions as a concave lens, the value of the focal length f of the optical element LN is negative. That is, when the focal point FP of the optical element LN is located on an opposite side (for example, a side of an object) of the eye EY of the wearer HM to the optical element LN, value of the focal length f is negative.

Note that when the liquid crystal layers 53A and 53B each function as a convex lens, the optical element LN functions as a convex lens. By contrast, when the liquid crystal layers 53A and 53B each function as a concave lens, the optical element LN functions as a concave lens. The second substrate 33 of each optical element LN is comparatively thin, and therefore, the eye EY of the wearer HM can regard the focal lengths of the liquid crystal layers 53A and 53B are substantially equal to each other. As such, the focal length f of the optical element LN is represented by the focal length of the liquid crystal layer 53A or 53B. That is, the focal length f of the optical element LN and the focal lengths of the respective liquid crystal layers 53A and 53B are substantially equivalent.

As described with reference to FIGS. 1 to 3D, the optical element LN includes the liquid crystal layer 53 in the first embodiment. In addition, the control section 17 controls light refraction through application of the control voltage CV to the liquid crystal layer 53. In the above configuration, a time period from a start to an end of light refraction control can be shortened when compared to a mechanical control mechanism. Consequently, high-speed control of the focal lengths f can be achieved.

Furthermore, as described with reference to FIGS. 3A to 3D, the control section 17 applies the control voltage CV to the liquid crystal layer 53 so as to form an electric potential gradient (electric potential gradient G or H) in a saw-tooth shape in the liquid crystal layer 53 for light refraction control. That is, the control section 17 controls light refraction by forming an electric potential gradient (electric potential gradient G or H) in a saw-tooth shape in the liquid crystal layer 53 through application of the control voltage CV to the liquid crystal layer 53. Thus, the liquid crystal layers 53 each function as a Fresnel lens (Fresnel convex or Fresnel concave lens). As a result, the optical element LN can have a relatively large diameter while an increase in thickness of the optical element LN can be suppressed. That is, the glasses 1 can be constituted by the optical elements LN having practical thickness and diameter.

The following describes the first liquid crystal unit A1 with reference to FIGS. 4 to 7. Note that the second liquid crystal unit A2 has the same configuration as the first liquid crystal unit A1.

Figure 4:
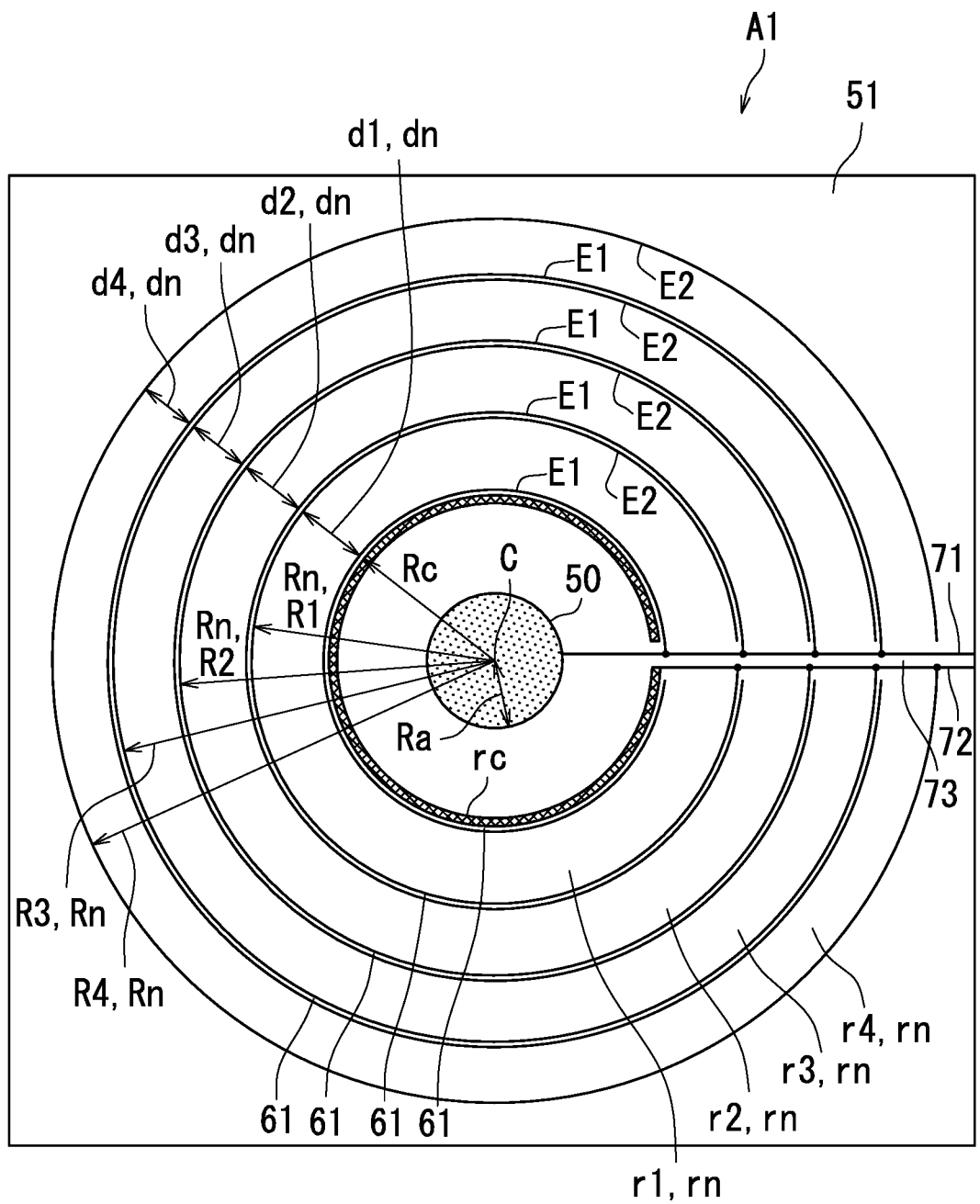
FIG. 4 is a plan view illustrating a first liquid crystal unit according to the first embodiment.
Figure 5:
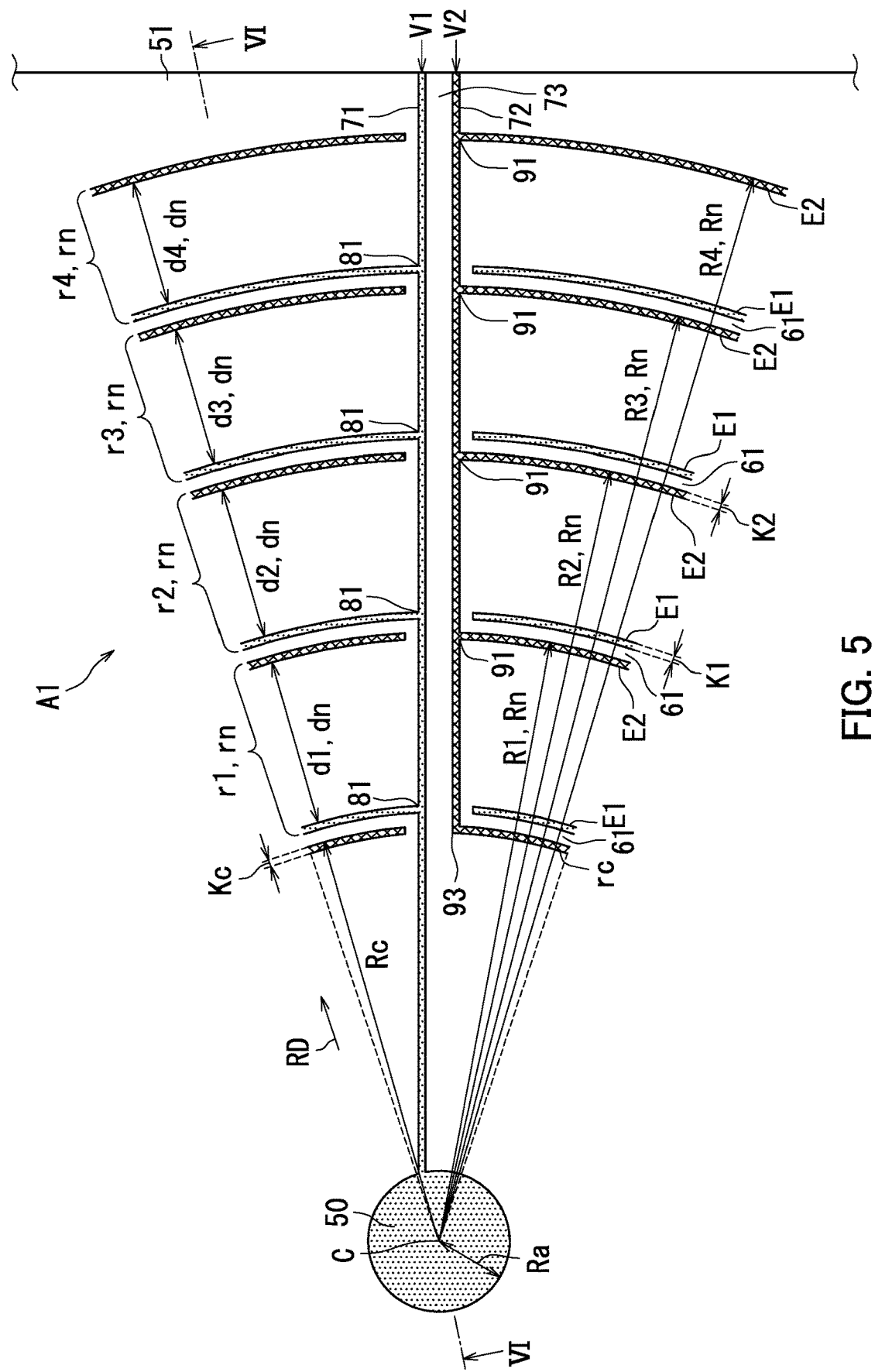
FIG. 5 is an enlarged plan view illustrating a part of the first liquid crystal unit according to the first embodiment.
Figure 6:
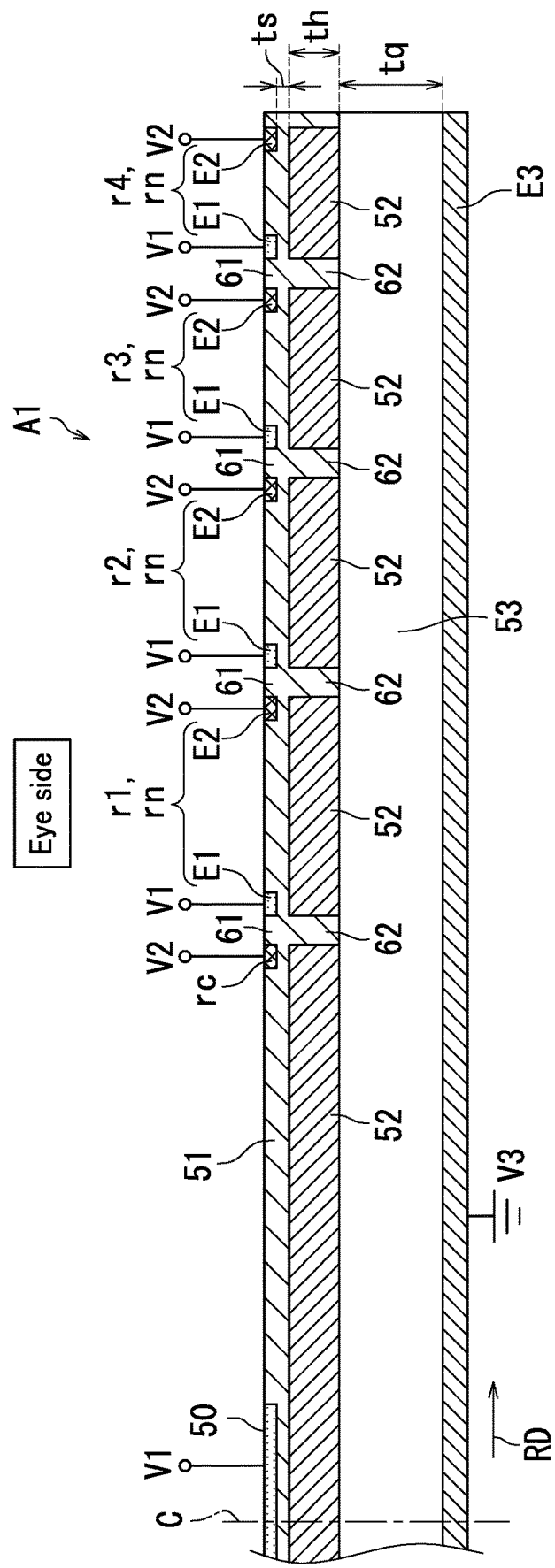
FIG. 6 is a cross-sectional view of the first liquid crystal unit taken along a line VI-VI in FIG. 5.

FIG. 4 is a plan view illustrating the first liquid crystal unit A1. FIG. 5 is an enlarged plan view illustrating a part of the first liquid crystal unit A1. FIG. 6 is a cross-sectional view of the first liquid crystal unit A1 taken along a line VI-VI in FIG. 5.

As illustrated in FIGS. 4 and 5, the first liquid crystal unit A1 includes a core electrode 50, a center electrode rc, electrode units r1 to r4, an insulating layer 51, a plurality of first boundary layers 61, a first lead wire 71, a second lead wire 72, and a third boundary layer 73. Each of the electrode units r1 to r4 includes a first electrode E1 and a second electrode E2. The electrodes 50, rc, E1, and E2 and the lead wires 71 and 72 each are for example transparent. The electrodes 50, rc, E1, and E2 and the lead wires 71 and 72 are each made of for example indium tin oxide (ITO).

The core electrode 50 has a disk shape. The disk shape refers to a circular sheet-like shape. The core electrode 50 is surrounded by the center electrode rc. The core electrode 50 and the center electrode rc are made of the same material as the first electrodes E1. The core electrode 50 has a radius Ra. The radius Ra refers to a distance from a center of the core electrode 50 to an outer periphery of the core electrode 50. The optical axis C is substantially perpendicular to the core electrode 50 and passes through the center of the core electrode 50.

The core electrode 50, the center electrode rc, the electrode units r1 to r4, the first boundary layers 61, the first lead wire 71, the second lead wire 72, and the third boundary layer 73 are located at the same layer level.

The core electrode 50, the center electrode rc, and the electrode units r1 to r4 are disposed coaxially about the core electrode 50 as a center. The center of the core electrode 50 indicates a center of a concentric shape formed of the core electrode 50, the center electrode rc, and the electrode units r1 to r4. The core electrode 50 and the center electrode rc are insulated from each other by the insulating layer 51. The insulating layer 51 is an electrical insulator. For example, the insulating layer 51 is transparent and made of silicon dioxide ($SiO_2$).

The respective first boundary layers 61 are disposed between the center electrode rc and the electrode unit r1, between the electrode unit r1 and the electrode unit r2, between the electrode unit r2 and the electrode unit r3, and between the electrode unit r3 and the electrode unit r4.

The center electrode rc, the first electrodes E1, and the second electrodes E2 each have an annular shape a part of which is cut. The center electrode rc has a radius Rc. The radius Rc refers to an outer radius of the center electrode rc. The electrode units r1 to r4 have radii R1 to R4, respectively (R4>R3>R2>R1). The radius Rc is smaller than each of the radii R1 to R4. The electrode units r1 to r4 have widths d1 to d4, respectively (d4<d3<d2<d1). Although the center electrode rc can be set to have any size, the radius Rc is preferably larger than the widths d1 to d4 in order to increase utilization efficiency of light. The center electrode rc has a width Kc. The width Kc refers to a width of the center electrode rc in the radial direction.

In the following description, the electrode units r1 to r4 may be each represented by an electrode unit rn. The radii R1 to R4 of the electrode units rn may be each represented by a radius Rn. The widths d1 to d4 of the electrode units rn may be each represented by a width dn. The subscript n represents an integer of at least 1 and no greater than N that is allotted to each of the electrode units in an ascending order from an electrode unit having the smallest radius to an electrode unit having the largest radium among the electrode units. N represents the number of electrode units, and is 4 in the first embodiment.

The following further describes the first liquid crystal unit A1 with reference to FIG. 5. As illustrated in FIG. 5, a width dn of each electrode unit rn is larger than a width K1 of each first electrode E1 and a width K2 of each second electrode E2. The width dn refers to a distance between a first electrode E1 and a second electrode E2 of a corresponding one of the electrode units rn. The width K1 refers to a width of each first electrode E1 in a radial direction thereof, and the width K2 refers to a width of each second electrode E2 in a radial direction thereof.

The radius rn of an electrode unit rn is represented by the radius of a second electrode E2 constituting the electrode unit rn. The radius of a second electrode E2 refers to an outer radius of the second electrode E2, and the radius of a first electrode E1 refers to an outer radius of the first electrode E1. The farther an electrode unit rn is located away from the optical axis C, the larger the radius Rn of the electrode unit rn is.

The width dn of an electrode unit rn is represented by a distance between the outer periphery of a first electrode E1 and the inner periphery of a second electrode E2 that constitute the electrode unit rn. An electrode unit rn of mutually adjacent electrode units rn that has a larger radius Rn than the other electrode unit rn has a width dn smaller than a width dn of the other of the mutually adjacent electrode units rn that has a smaller radius Rn. The electrode units rn surround the center electrode rc.

The first lead wire 71 extends from the core electrode 50 toward a first electrode E1 having the largest radius without contacting the second electrodes E2. The first lead wire 71 has a linear shape. The first lead wire 71 is made of the same material as the first electrodes E1.

The core electrode 50 is connected to the first lead wire 71. One end 81 of opposite ends of each first electrode E1 is connected to the first lead wire 71. In the above configuration, a first voltage V1 as the control voltage CV is supplied to the core electrode 50 and the first electrodes E1 through the first lead wire 71.

The radius Ra of the core electrode 50 is larger than the width Kc of the center electrode rc, the width K1 of the first electrodes E1, or the width K2 of the second electrodes E2. In the first embodiment, the radius Ra of the core electrode 50 is larger than each of the width Kc of the center electrode rc, the width K1 of the first electrodes E1, and the width K2 of the second electrodes E2. However, the radius Ra of the core electrode 50 is smaller than the inner radius of the center electrode rc.

The second lead wire 72 extends from the center electrode rc toward a second electrode E2 having the largest radius among the second electrodes E2 without contacting the first electrodes E1. The second lead wire 72 has a linear shape. The second lead wire 72 is made of the same material as the second electrodes E2.

One end 93 of opposite ends of the center electrode rc is connected to the second lead wire 72. One end 91 of opposite ends of each second electrode E2 is connected to the second lead wire 72. In the above configuration, a second voltage V2 as the control voltage CV is supplied to the center electrode rc and the second electrodes E2 through the second lead wire 72.

The third boundary layer 73 shares the electrical insulator with the insulating layer 51 and is made of the same material as the insulating layer 51. That is, the third boundary layer 73 is formed as a part of the insulating layer 51. Note that the third boundary layer 73 may be an electrical insulator different from the insulating layer 51. The third boundary layer 73 is located between the first and second lead wires 71 and 72.

The following further describes the first liquid crystal unit A1 with reference to FIG. 6. In addition to the core electrode 50, the center electrode rc, the electrode units r1 to r4, the insulating layer 51, and the first boundary layers 61, the first liquid crystal unit A1 further includes a plurality of second boundary layers 62, a plurality of highly resistive layer 52 (resistance layers), a liquid crystal layer 53, and a third electrode E3, as illustrated in FIG. 6. The elements of the first liquid crystal unit A1 are arranged symmetrically with respect to the optical axis C.

The center electrode rc is adjacent to a first electrode E1 of the electrode unit r1 with one of the first boundary layers 61 therebetween. A second electrode E2 of one of mutually adjacent electrode units rn is adjacent to a first electrode E1 of the other of the mutually adjacent electrode units rn with a corresponding one of the first boundary layers 61 therebetween. The first boundary layers 61 electrically insulates the center electrode rc from the first electrode E1 of the electrode unit r1 and electrically insulates the first electrodes E1 from the respective adjacent second electrodes E2. The first boundary layers 61 share the electrical insulator with the insulating layer 51 and are made of the same material as the insulating layer 51. That is, the first boundary layers 61 are formed as parts of the insulating layer 51. Note that the first boundary layers 61 may each be an electrical insulator different from the insulating layer 51.

The insulating layer 51 is located between each location of the core electrode 50 and the center electrode rc and a location of a corresponding one of the highly resistive layers 52 to electrically insulate the core electrode 50 and the center electrode rc from the highly resistive layers 52. The insulating layer 51 is located between a location of the first and second electrodes E1 and E2 and a location of the highly resistive layers 52 to electrically insulate the first electrodes E1, the second electrodes E2, and the highly resistive layers 52 from one another. The insulating layer 51 is located between the core electrode 50 and the center electrode rc to electrically insulate the core electrode 50 from the center electrode rc. The insulating layer 51 is located between a first electrode E1 and a second electrode E2 in each of the electrode units rn to electrically insulate the first electrode E1 from the second electrode E2.

The insulating layer 51 has a thickness ts. The thickness ts refers to a thickness of a part of the insulating layer 51 located between a first electrode E1 and a highly resistive layer 52, a thickness of a part thereof located between a second electrode E2 and a highly resistive layer 52, a part thereof located between the core electrode 50 and a highly resistive layer 52, or a thickness of a part thereof located between the center electrode rc and a highly resistive layer 52.

The highly resistive layers 52 and the second boundary layers 62 are located at the same layer level. One of the highly resistive layers 52 located the most inward among the highly resistive layers 52 has a disc shape and faces the core electrode 50 and the center electrode rc with the insulating layer 51 therebetween. The other highly resistive layers 52 each have an annular band shape and each face a corresponding one of the electrode units r1 to r4 with the insulating layer 51 therebetween.

One of the highly resistive layers 52 is located between a location of the core electrode 50 and the center electrode rc and a location of the liquid crystal layer 53. The other highly resistive layers 52 are located between the respective electrode units rn and the liquid crystal layer 53. That is, the highly resistive layers 52 are each located between the insulating layer 51 and the third electrode E3. Specifically, the highly resistive layers 52 are each located between the insulating layer 51 and the liquid crystal layer 53. The highly resistive layers 52 have an electrical resistivity (specific resistivity) larger than those of the core electrode 50, the center electrode rc, the first electrodes E1, and the second electrodes E2 and smaller than that of the insulating layer 51. For example, the highly resistive layers 52 are transparent and made of zinc oxide (ZnO).

The electrical resistivity of the highly resistive layers 52 is set for example to a suitable electrical resistivity. The suitable electrical resistivity refers to an electrical resistivity suitable for formation of an electric potential gradient that can attain a desired refracting angle in a liquid crystal layer.

The highly resistive layers 52 have a thickness th. The thickness ts of the insulating layer 51 is smaller than the thickness th of the highly resistive layers 52. In the above configuration, concentration of equipotentials substantially parallel to a radial direction RD of the first liquid crystal unit A1 can be reduced in a part of the insulating layer 51 located between each second electrode E2 and a corresponding one of the highly resistive layers 52 and a part of the insulating layer 51 located between each first electrode E1 and a corresponding one of the highly resistive layers 52. As a result, potential drop and rise can be reduced at a part of the insulating layer 51 located between each second electrode E2 and a corresponding one of the highly resistive layers 52 and a part of the insulating layer 51 located between each first electrode E1 and a corresponding one of the highly resistive layers 52. In the following description, potential drop and rise as above may be referred to as a "potential smoothing phenomenon". The radial direction RD refers to a direction perpendicular to and away from the optical axis C.

Typically, the potential smoothing phenomenon is more significant as the width dn of an electrode unit rn is smaller. Change in suitable frequency and suitable electrical resistivity occurs typically through the potential smoothing phenomenon. The suitable frequency refers to a frequency suitable for formation a desired equielectric potential gradient in a liquid crystal layer.

By contrast, the thickness ts of the insulating layer 51 is set smaller than the thickness th of the highly resistive layers 52 to reduce the potential smoothing phenomenon in the first embodiment. Therefore, the potential smoothing phenomenon can be reduced without depending on the widths dn of the electrode units rn. As a result, variation in suitable frequency and suitable electrical resistivity depending on the widths dn of the electrode units rn (intervals between electrodes) can be reduced. For example, the first voltage V1 is set to have a frequency f1 among a plurality of the suitable frequencies and the second voltage V2 is set to have a frequency f2 among a plurality of suitable frequencies.

A smaller thickness ts of the insulating layer 51 is more preferable so long as insulation is maintained between the core electrode 50 and s corresponding one of the highly resistive layer 52, between the center electrode rc and a corresponding one of the highly resistive layer 52, between the first electrodes E1 and corresponding ones of the highly resistive layer 52, and between the second electrodes E2 and corresponding ones of the highly resistive layers 52. The reason thereof is that variation in suitable frequency and suitable electrical resistivity depending on the widths do of the electrode units rn can be reduced more as the thickness is of the insulating layer 51 is smaller.

The second boundary layers 62 are each located between mutually adjacent highly resistive layers 22. The second boundary layers 62 share the electrical insulator with the insulating layer 51 and are made of the same material as the insulating layer 51. That is, the second boundary layers 62 are formed as parts of the insulating layer 51. The second boundary layers 62 may each be an electrical insulator different from the insulating layer 51.

The second boundary layers 62 have a width that is substantially equal to the width of the first boundary layers 61. The width of the second boundary layers 62 refers to a width of each second boundary layer 62 in a radial direction thereof. The width of the first boundary layers 61 refers to a width of each first boundary layer 61 in a radial direction thereof. The second boundary layers 62 each are opposite to a corresponding one of the first boundary layers 61 with the insulating layer 51 therebetween.

The liquid crystal layer 53 contains the liquid crystals. The liquid crystal layer 53 is located between the respective electrode units rn and the third electrode E3 and between a location of the third electrode E3 and each location of the core electrode 50 and the center electrode rc. The liquid crystal layer 53 is located between the insulating layer 51 and the third electrode E3. Specifically, the liquid crystal layer 53 is located between the respective highly resistive layers 52 and the third electrode E3. The liquid crystal layer 53 has a thickness tq.

A third voltage V3 is applied to the third electrode E3. In the first embodiment, the third electrode E3 is grounded and the third voltage V3 is set to the ground potential (0 V). The third electrode E3 has a sheet-like shape and is in a single-layer structure. The third electrode E3 is located opposite to the core electrode 50, the center electrode rc, and the electrode units rn with the liquid crystal layer 53, the highly resistive layers 52, and the insulating layer 51 therebetween. For example, the first, second, and third electrodes E1, E2, and E3 have substantial equal electrical resistivity.

The core electrode 50, the center electrode rc, and the electrode units r1 to r4 are closer to the eye than the liquid crystal layer 53.

As described with reference to FIGS. 4 to 6, the first electrodes E1 and the second electrodes E2 are insulated from one another by the insulating layer 51 and the core electrode 50 and the center electrode rc are insulated from each other by the insulating layer 51. In the above configuration, no electric current flows between the respective first electrodes E1 and the respective second electrodes E2 and between the core electrode 50 and the center electrode rc. Power loss in the first liquid crystal element A1 can be reduced accordingly. The same is applied to the second liquid crystal unit A2.

In the first embodiment, an electrode unit rn located farther away from the optical axis C has a smaller width dn. By contrast, the thickness is of the insulating layer 51 is smaller than the thickness th of the highly resistive layers 52. Thus, variation in suitable frequency and suitable electrical resistivity depending on the widths dn of the electrode units rn can be reduced. As a result, it is not necessary to make the frequency f1 of the first voltage V1 and the frequency f2 of the second voltage V2 different between an electrode unit rn close to the optical axis c and an electrode unit rn away from the optical axis C. Furthermore, it is not necessary to make the electrical resistivity different among the highly resistive layers 52. Accordingly, complicate design of the first liquid crystal unit A1 can be avoided and an increase in cost of the first liquid crystal unit A1 can be suppressed. The same is applied to the second liquid crystal unit A2.

Figure 7:
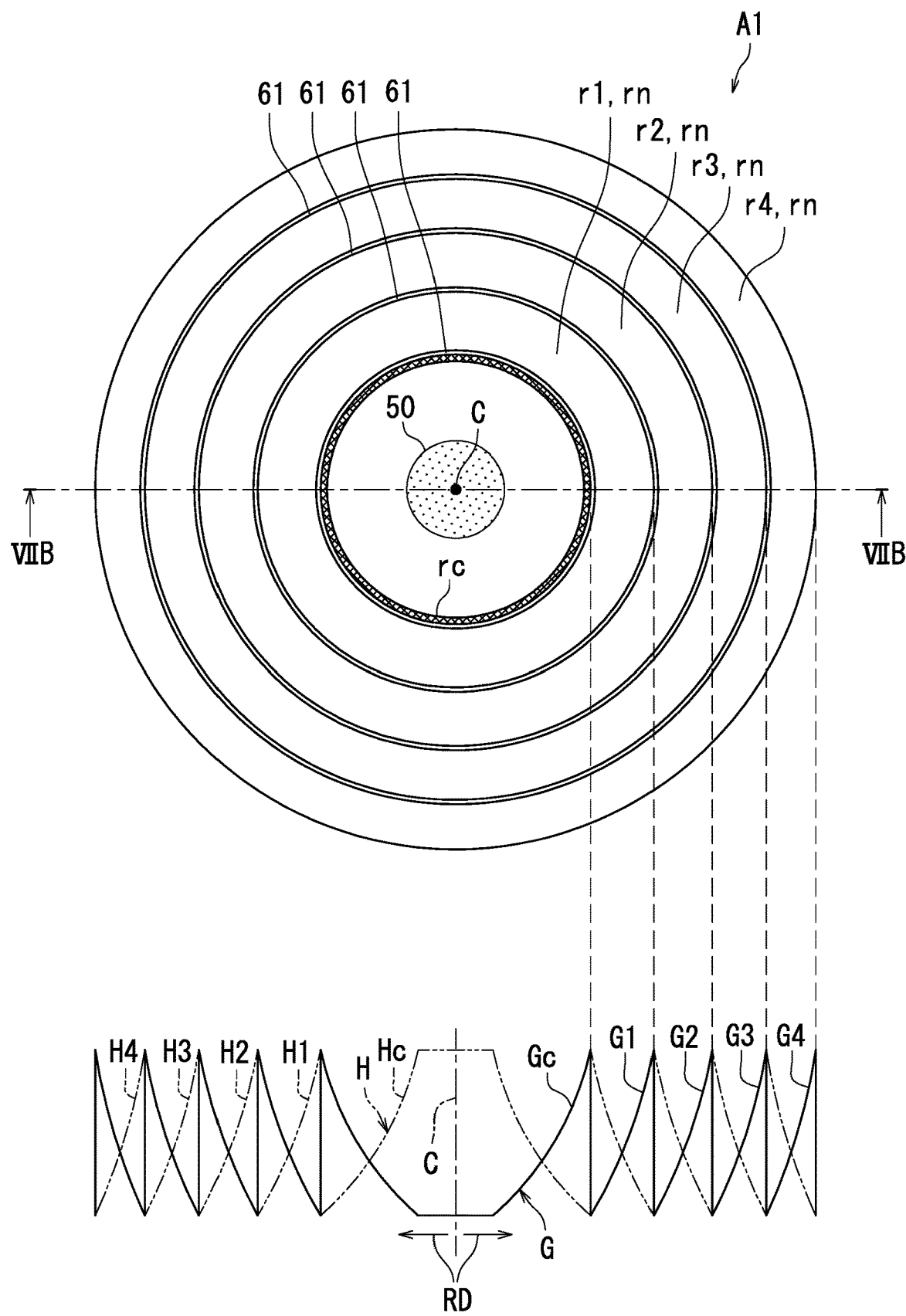
FIG. 7 is a diagram illustrating the first liquid crystal unit and an electric potential gradient in the liquid crystal layer according to the first embodiment.

The following describes the electric potential gradient G formed in the liquid crystal layer 53 with reference to FIGS. 6 and 7. FIG. 7 includes a plan view illustrating the first liquid crystal unit A1. In FIG. 7, the first and second lead wires 71 and 72 and the third boundary layer 73 are omitted for the sake of simplicity of illustration. For also the sake of simplicity of illustration, the center electrode rc and the first and second electrodes E1 and E2 are each drawn as that having an annular shape without a cut. FIG. 7 also includes a diagram illustrating the electric potential gradient G in the liquid crystal layer 53. The electric potential gradient G appearing in a section taken along a line VIIB-VIIB is drawn in FIG. 7.

As illustrated in FIGS. 6 and 7, when the first voltage V1 is applied to the core electrode 50 and the first electrodes E1 and the second voltage V2 is applied to the center electrode rc and the second electrodes E2 on condition that the first voltage V1 is lower than the second voltage V2, the electric potential gradient G (solid line) in a saw-tooth shape symmetrical with respect to the optical axis C is formed in the liquid crystal layer 53 in the presence of the highly resistive layers 52, the first boundary layers 61, and the second boundary layers 62. In other words, the electric potential gradient G that is coaxial is formed when the first liquid crystal unit A1 is viewed in plan (i.e., when the first liquid crystal unit A1 is viewed in a direction in which the optical axis C extends).

Note that the first voltage V1 being lower than the second voltage V2 means at least a voltage value v1 of the first voltage V1 being smaller a voltage value v2 of the second voltage V2.

The electric potential gradient G includes an electric potential gradient Gc formed in correspondence with the core electrode 50 and the center electrode rc, an electric potential gradient G1 formed in correspondence with the electrode unit r1, an electric potential gradient G2 formed in correspondence with the electrode unit r2, an electric potential gradient G3 formed in correspondence with the electrode unit r3, and an electric potential gradient G4 formed in correspondence with the electrode unit r4. The electric potential gradients Gc and G1 to G4 each are an electric potential gradient in the radial direction RD of the first liquid crystal unit A1.

The electric potential gradient Gc and G1 to G4 each are in a smooth curved shape with no step and no extremum value (minimum or maximum value) owing to operation of the highly resistive layers 52.

The electric potential gradient Gc is expressed for example by a quadratic curve. The electric potential gradients Gc and G1 to G4 each have a potential increasing in the radial direction RD from the optical axis C. The farther away from the optical axis C an electric potential gradient is located, the steeper the electric potential gradient is among the electric potential gradients Gc and G1 to G4.

As a result of formation of the electric potential gradient G in the liquid crystal layer 53, a refractive index gradient corresponding to the electric potential gradient G is formed in the liquid crystal layer 53. Accordingly, incident light rays entering the liquid crystal layer 53 are refracted at refracting angles corresponding to the respective electric potential gradients Gc and G1 to G4 and exit as outgoing light rays from the liquid crystal layer 53. As a result of an electric potential gradient located farther away from the optical axis C being steeper, the refracting angle is larger as it is farther away from the optical axis C and the outgoing light rays focus toward the optical axis C. Thus, the first liquid crystal unit A1 can be caused to function as a convex Fresnel lens.

By contrast, when the first voltage V1 is applied to the core electrode 50 and the first electrodes E1 and the second voltage V2 is applied to the center electrode rc and the second electrodes E2 on condition that the first voltage V1 is higher than the second voltage V2, an electric potential gradient H (two-dot chain line) in a saw-tooth shape symmetrical with respect to the optical axis C is formed in the liquid crystal layer 53 in the presence of the highly resistive layers 52, the first boundary layers 61, and the second boundary layers 62. In other words, the electric potential gradient H that is coaxial is formed when the first liquid crystal unit A1 is viewed in plan.

Note that the first voltage V1 being higher than the second voltage V2 means at least the voltage value v1 of the first voltage V1 being larger the voltage value v2 of the second voltage V2. Furthermore, the first voltage V1 being equal to the second voltage V2 means the voltage value v1 being equal to the voltage value v2 and the frequency f1 of the first voltage V1 being equal to the frequency f2 of the second voltage V2.

The electric potential gradient H includes an electric potential gradient Hc formed in correspondence with the core electrode 50 and the center electrode rc, an electric potential gradient H1 formed in correspondence with the electrode unit r1, an electric potential gradient H2 formed in correspondence with the electrode unit r2, an electric potential gradient H3 formed in correspondence with the electrode unit r3, and an electric potential gradient H4 formed in correspondence with the electrode unit r4. The electric potential gradients Hc and H1 to H4 each are an electric potential gradient in the radial direction RD of the first liquid crystal unit A1.

The electric potential gradient Hc and H1 to H4 each are in a smooth curved shape with no step and no extremum value (minimum or maximum value) owing to the operation of the highly resistive layers 52.

The electric potential gradient Hc is expressed for example by a quadratic curve. The electric potential gradients Hc and H1 to H4 each have a potential decreasing in the radial direction RD from the optical axis C. The farther away from the optical axis C an electric potential gradient is located, the steeper the electric potential gradient is among the electric potential gradients Hc and H1 to H4.

As a result of formation of the electric potential gradient H in the liquid crystal layer 53, a refractive index gradient corresponding to the electric potential gradient H is formed in the liquid crystal layer 53. Accordingly, incident light rays entering the liquid crystal layer 53 are refracted away from the optical axis C at refracting angles corresponding to the respective electric potential gradients Hc and H1 to H4 and exit as outgoing light rays from the liquid crystal layer 53. As a result of an electric potential gradient located farther away from the optical axis C being steeper, the refracting angle is larger as it is farther away from the optical axis C and the outgoing light rays diverge away from the optical axis C. Thus, the first liquid crystal unit A1 can be caused to function as a concave Fresnel lens.

As described with reference to FIGS. 6 and 7, one of the highly resistive layers 52 is provided for the core electrode 50 and the center electrode rc and the other highly resistive layers 52 are provided for the respective electrode units rn. In the above configuration, the electric potential gradients Gc and G1 to G4 and the electric potential gradients Hc and H1 to H4 each are in a smooth curved shape with no step. As a result, wave aberration of outgoing light rays can be reduced. Moreover, the electric potential gradients Gc and G1 to G4 and the electric potential gradients Hc and H1 to H4 each have no extremum. As a result, incident light rays can be refracted with high precision and therefore a high precision Fresnel lens can be formed by the first liquid crystal unit A1. The same is applied to the second liquid crystal unit A2.

Figure 8:
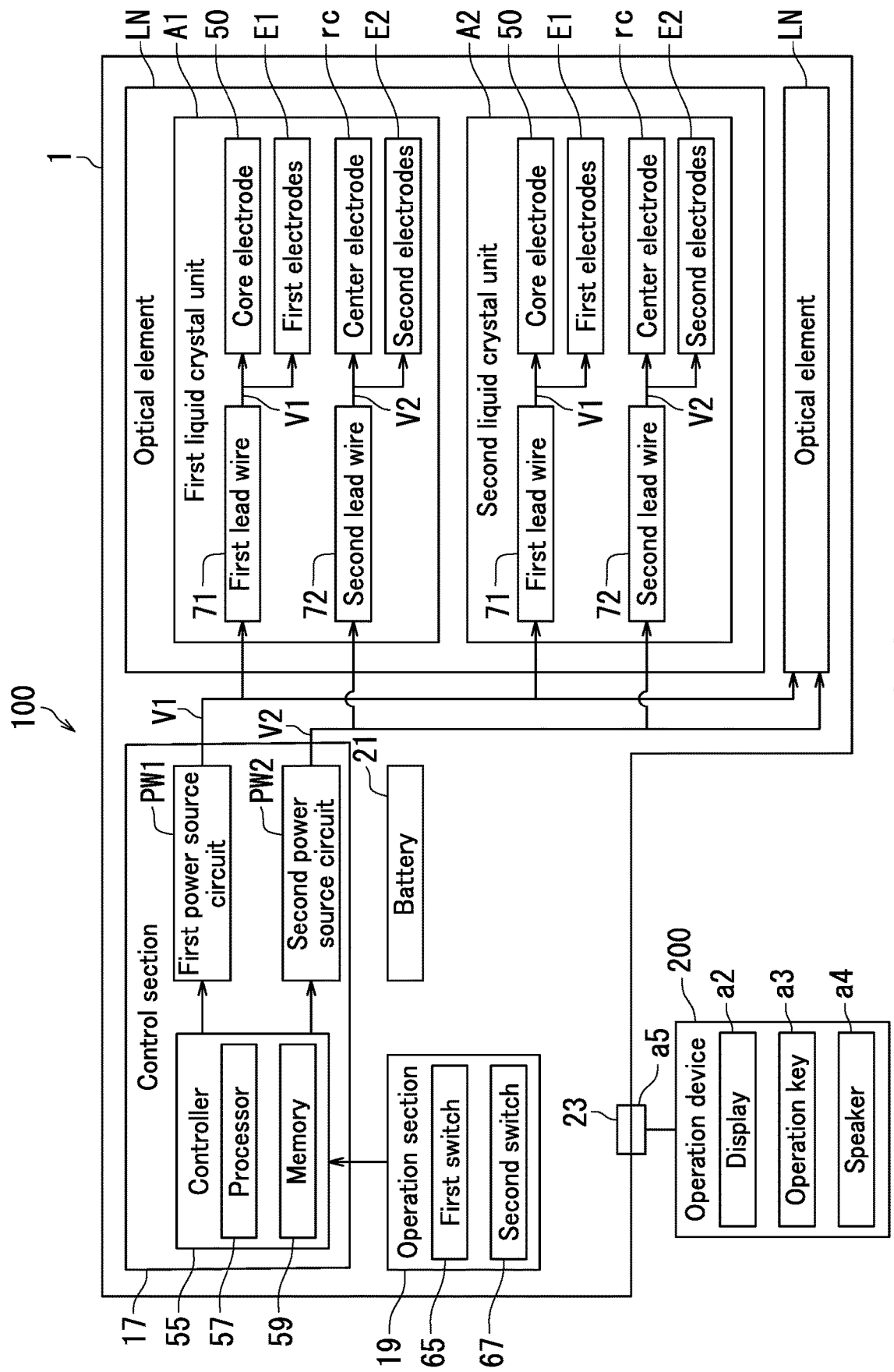
FIG. 8 is a diagram illustrating an electrical configuration of the eyeglass system according to the first embodiment.

The following describes operation of the glasses 1 with reference to FIG. 8. FIG. 8 is a diagram illustrating an electrical configuration of the eyeglass system 100. As illustrated in FIG. 8, the control section 17 of the glasses 1 includes a controller 55, a first power supply circuit PW1, and a second power supply circuit PW2. The controller 55 includes a processor 57 and memory 59. The operation section 19 includes a first switch 65 and a second switch 67.

The controller 55 controls the first and second power supply circuits PW1 and PW2. Specifically, the processor 57 executes computer programs stored in the memory 59 to control the first and second power supply circuits PW1 and PW2. The memory 59 stores therein various data and the computer programs.

The first power supply circuit PW1 under control by the controller 55 applies the first voltage V1 to the core electrode 50 and the first electrodes E1 of each of the first and second liquid crystal units A1 and A2 through the respective first lead wires 71 of the first and second liquid crystal units A1 and A2. The first voltage V1 is an example of the control voltage CV. The first voltage V1 is an alternating current voltage having a frequency f1. The waveforms of the first voltage V1 are for example square waves. The first voltage V1 has an effective value V1$e$ and a maximum amplitude V1$m$. The first voltage V1 has the voltage value v1.

The second power supply circuit PW2 under control by the controller 55 applies the second voltage V2 to the center electrode rc and the second electrodes E2 of each of the first and second liquid crystal units A1 and A2 through the respective second lead wires 72 of the first and second liquid crystal units A1 and A2. The second voltage V2 is an example of the control voltage CV. The second voltage V2 is an alternating current voltage having a frequency f2. The waveforms of the second voltage V2 are for example square waves. The second voltage V2 has an effective value V2$e$ and a maximum amplitude V2$m$. The second voltage V2 has the voltage value v2.

Through application of the first voltage V1 to the core electrode 50 and the first electrodes E1 and the second voltage V2 to the center electrode rc and the second electrodes E2, the first and second voltages V1 and V2 are applied to the liquid crystal layer 53 to form an electric potential gradient in the liquid crystal layer 53.

The controller 55 controls the first and second power supply circuits PW1 and PW2 in response to the internal operation signal from the operation section 19 or the external operation signal from the operation device 200 to control the first and second voltages V1 and V2. The electric potential gradient in the liquid crystal layer 53 can be controlled by controlling the first and second voltages V1 and V2. Superficially, the controller 55 controls the first and second power supply circuits PW1 and PW2 to control a difference value DFF (=V1−V2) between the first and second voltages V1 and V2. The electric potential gradient in the liquid crystal layer 53 can be controlled by controlling the difference value DFF. As a result, the focal length f of the optical element LN can be controlled.

Control of the first and second voltages V1 and V2 by the controller 55 may be control of the voltage values v1 and v2, the frequencies f1 and f2, or both the voltage values v1 and v2 and the frequencies f1 and f2 in the present description. Also, control of the difference value DFF by the controller 55 may be control of a difference value DV (=v1−v2) between the first and second voltage values v1 and v2, control of a difference value DF (=f1−f2) between the frequencies f1 and f2, or control of the difference values DV and DF. In order to form an electric potential gradient in the liquid crystal layer 53, it is only required that at least the voltage value v1 is different from the voltage value v2. The difference value DF may be 0. The electric potential gradient in the liquid crystal layer 53 can be extinguished by setting the difference value DV to 0.

Further specifically, when the controller 55 controls the first and second power supply circuits PW1 and PW2 so that the voltage value v1 of the first voltage V1 is smaller than the voltage value v2 of the second voltage V2, the optical element LN (specifically the liquid crystal layer 53) functions as a convex lens. Because, the electric potential gradient G is formed in the liquid crystal layer 53 (see FIG. 3A). Furthermore, when the voltage value v1 is smaller than the voltage value v2, the larger an absolute value of the difference value DV (=v1−v2) between the voltage value v1 and the voltage value v2 is, the smaller an absolute value of the focal length f of the optical element LN functioning as a convex lens is. In the above configuration, when the controller 55 controls the first and second power supply circuits PW1 and PW2 to increase the absolute value of the difference value DV on condition that the voltage value v1 is smaller than the voltage value v2, the absolute value of the focal length f of the optical element LN functioning as a convex lens is decreased.

In the present description, the voltage value v1 refers to the effective value V1$e$ or the maximum amplitude V1$m$ of the first voltage V1. The voltage value v2 refers to the effective value V2$e$ or the maximum amplitude V2$m$ of the second voltage V2. The difference value DV refers to a difference (=V1$e$−V2$e$) between the effective value V1$e$ and the effective value V2$e$ or a difference value (=V1$m$−V2$m$) between the maximum amplitude V1$m$ and the maximum amplitude V2$m$.

When the voltage value v1 is smaller than the voltage value v2 and the frequency f1 is lower than the frequency f2, the larger an absolute value of the difference value DF(=f1−f2) between the frequency f1 and the frequency f2 is, the smaller the absolute value of the focal length f of the optical element LN functioning as a convex lens is. In the above configuration, when the controller 55 controls the first and second power supply circuits PW1 and PW2 to increase the absolute value of the difference value DF on condition that the voltage value v1 is smaller than the voltage value v2 and the frequency f1 is lower than the frequency f2, the absolute value of the focal length f of the optical element LN functioning as a convex lens is decreased.

By contrast, when the controller 55 controls the first and second power supply circuits PW1 and PW2 so that the voltage value v1 of the first voltage V1 is larger than the voltage value v2 of the second voltage V2, the optical element LN (specifically the liquid crystal layer 53) functions as a concave lens. Because, the electric potential gradient H is formed in the liquid crystal layer 53 (see FIG. 3D). When the voltage value v1 is larger than the voltage value v2, the larger the absolute value of the difference DV between the voltage value v1 and the voltage value v2 is, the smaller the absolute value of the focal length f of the optical element LN functioning as a concave lens is. In the above configuration, when the controller 55 controls the first and second power supply circuits PW1 and PW2 to increase the absolute value of the difference value DV on condition that the voltage value v1 is larger than the voltage value v2, the absolute value of the focal length f of the optical element LN functioning as a concave lens is decreased.

When the voltage value v1 is larger than the voltage value v2 and the frequency f1 is higher than the frequency f2, the larger the absolute value of the difference value DF between the frequencies f1 and f2 is, the smaller the absolute value of the focal length f of the optical element LN functioning as a concave lens is. In the above configuration, when the controller 55 controls the first and second power supply circuits PW1 and PW2 to increase the absolute value of the difference value DF on condition that the voltage value v1 is larger than the voltage value v2 and the frequency f1 is higher than the frequency f2, the absolute value of the focal length f of the optical element LN functioning as a concave lens is decreased.

When the controller 55 controls the first and second power supply circuits PW1 and PW2 so that the voltage value v1 is equal to the voltage value v2 and the frequency f1 is equal to the frequency f2, the electric potential gradient is extinguished from the liquid crystal layer 53. The optical element LN accordingly loses a function as a convex lens and a concave lens. As a result, the optical element neither converges nor diverges light rays and incident light rays perpendicularly entering the optical element LN travel straight.

For example, when the wearer HM pushes the first switch 65, the first switch 65 transmits a first internal operation signal to the controller 55. Upon receiving the first internal operation signal, the controller 55 controls the first and second power supply circuits PW1 and PW2 so as to increase an absolute value of the difference value DFF (e.g., the difference value DV). As a result, the absolute value of the focal length f is decreased.

For example, when the wearer HM pushes the second switch 67, the second switch 67 transmits a second internal operation signal to the controller 55. Upon receiving the second internal operation signal, the controller 55 controls the first and second power supply circuits PW1 and PW2 so as to decrease the absolute value of the difference value DFF (e.g., the difference value DV). As a result, the absolute value of the focal length f is increased.

For example, the first switch 65 is disposed on an upper end surface of one of the temples 11 (also referred to below as a "specific temple 11" in this example) while the second switch 67 is disposed on a lower end surface of the specific temple 11. The first switch 65 in the upper end surface of the specific temple 11 is preferably located farther away from a corresponding one of the hinges 9 than the second switch 67 in the lower end surface of the specific temple 11. Because, when the specific temple 11 is held by the forefinger and the thumb of the wearer HM, the first switch 65 in the upper end surface can be easily operated by the forefinger and the second switch 67 in the lower end surface can be easily operated by the thumb.

As described with reference to FIG. 8, the electric potential gradient in the liquid crystal layer 53 can be easily controlled by controlling the control voltage CV (specifically, the first and second voltages V1 and V2) in the first embodiment. Thus, the focal length f of the optical element LN can be easily changed across a comparatively wide range from a negative value (corresponding to a concave lens) to a positive value (corresponding to a convex lens) by control of the control voltage CV. That is, the power of the glasses 1 can be easily changed across a wide range. In particular, in the presence of the electric potential gradient in a sawtooth shape, the focal length f of the optical element LN can be changed across a wide range by control of the control voltage CV and an increase in thickness of the optical element LN can be suppressed.

(Second Embodiment)

Figure 9:
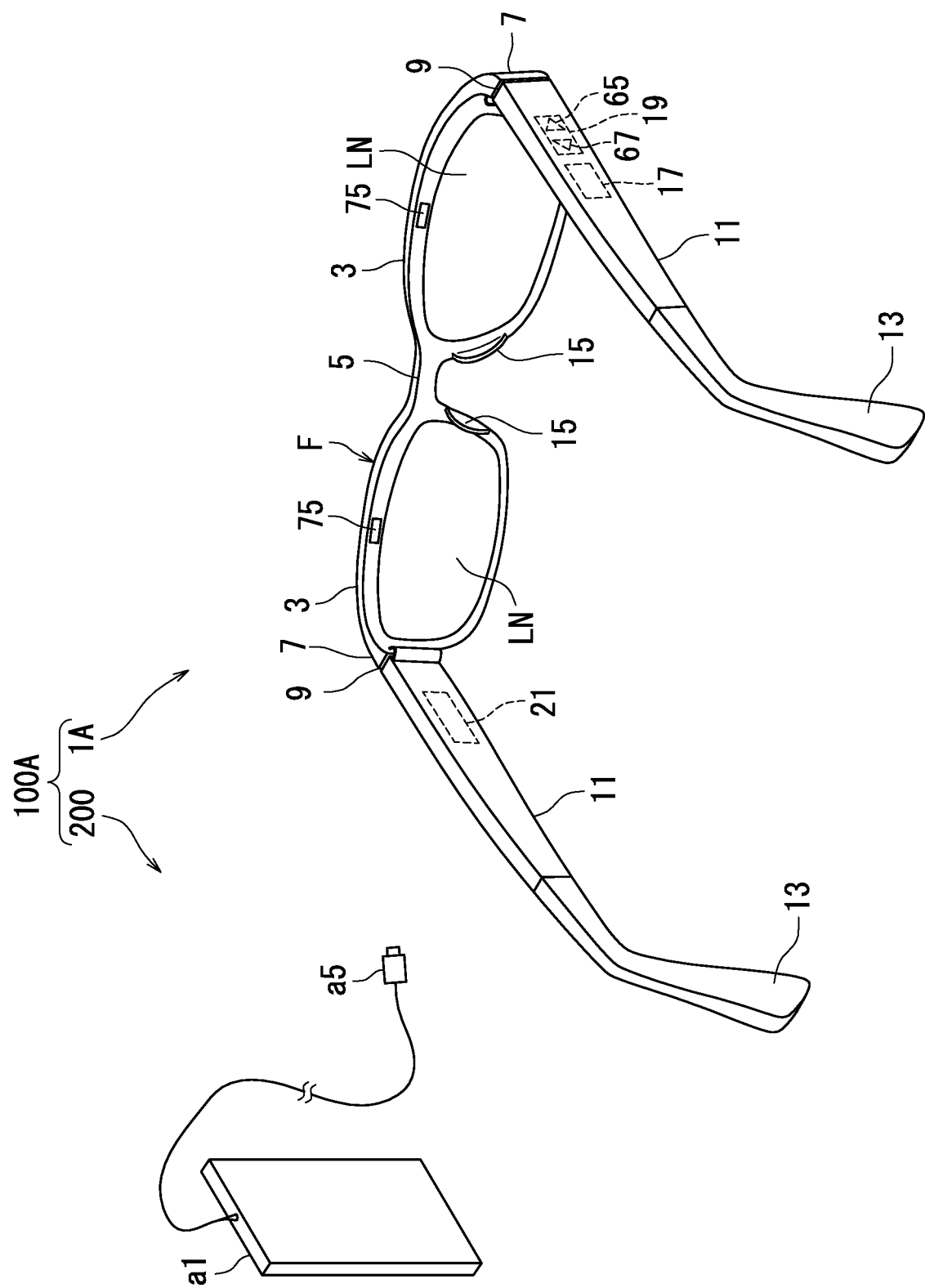
FIG. 9 is a perspective view illustrating an eyeglass system according to a second embodiment of the present invention.
Figure 10:
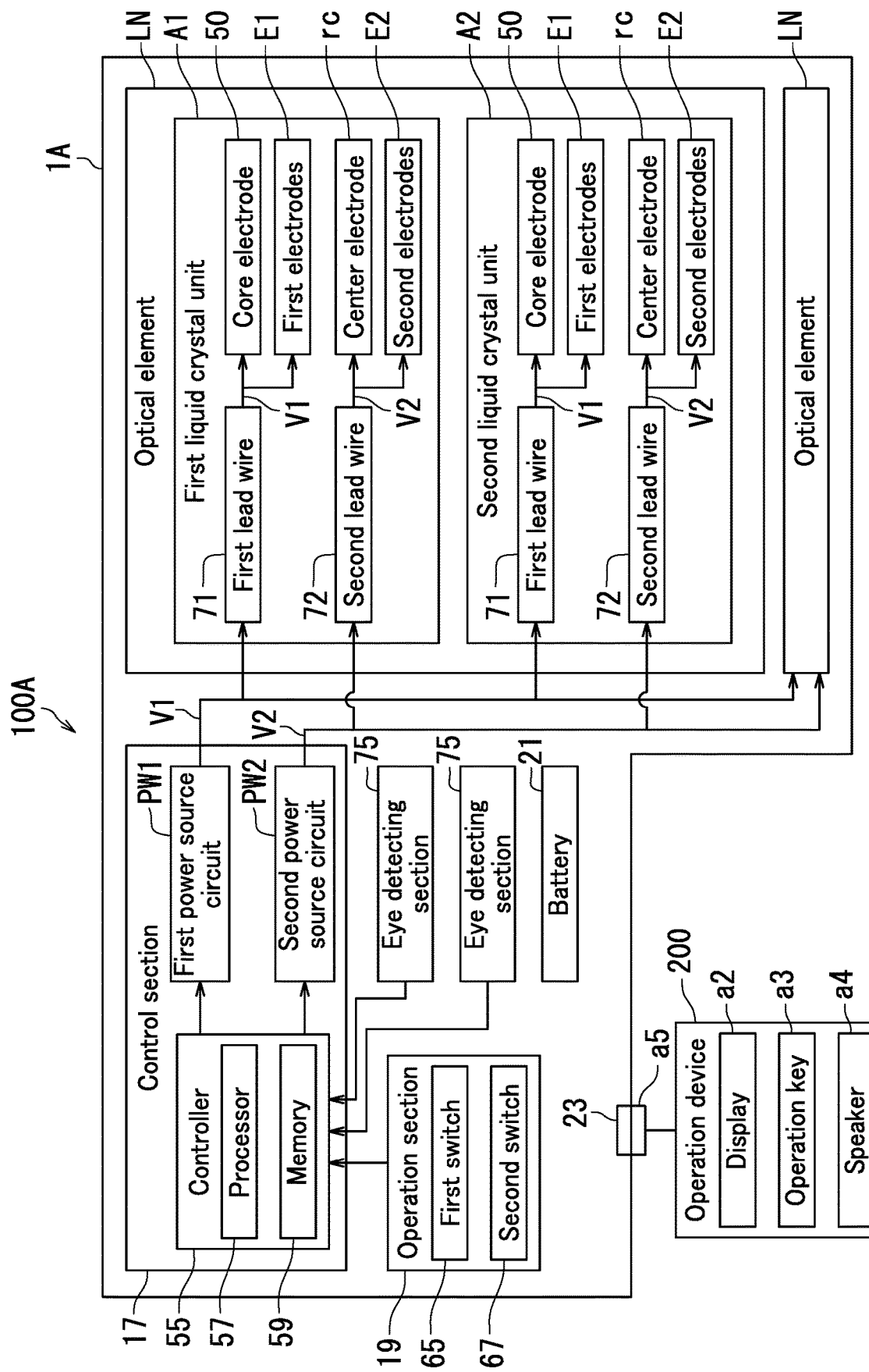
FIG. 10 is a diagram illustrating an electrical configuration of the eyeglass system according to the second embodiment.
Figure 11:
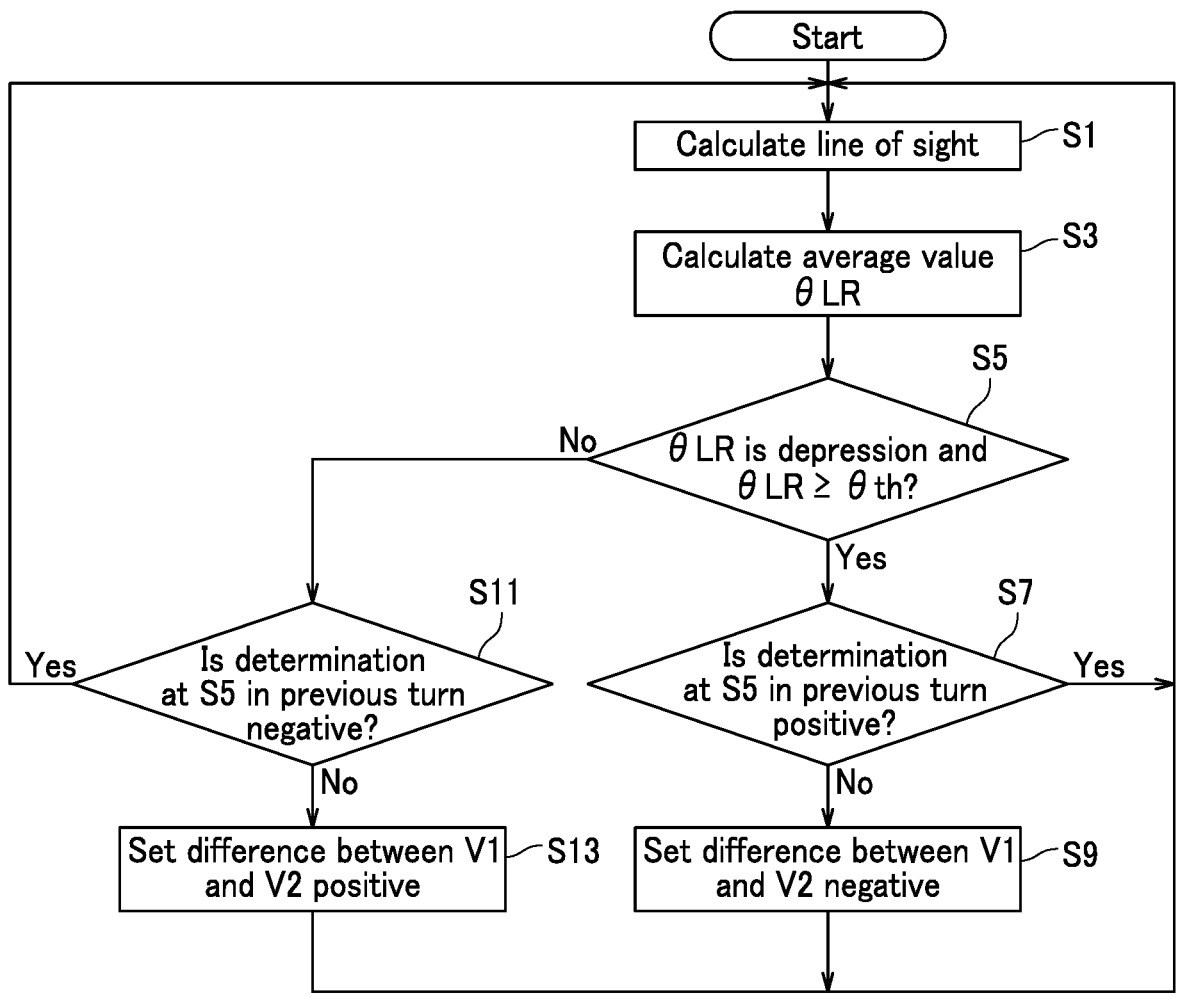
FIG. 11 is a flowchart depicting voltage control processing according to the second embodiment.

The following describes an eyeglass system 100A according to a second embodiment of the present invention with reference to FIGS. 9 to 11. A main difference of the eyeglass system 100A from the eyeglass system 100 according to the first embodiment lies in that the focal length f is controlled according to a line-of-sight direction of the wearer HM. The following mainly describes differences of the second embodiment from the first embodiment.

FIG. 9 is a perspective view illustrating the eyeglass system 100A. FIG. 10 is a diagram illustrating an electrical configuration of the eyeglass system 100A.

As illustrated in FIG. 9, the eyeglass system 100A includes glasses 1A and the operation device 200. In addition to the elements of the glasses 1 in the first embodiment, the glasses 1A further includes a pair of eye detecting sections 75. The eye detecting sections 75 each detect movement of a corresponding one of the eyes of the wearer HM. Specifically, the respective eye detecting sections 75 detect movement of the left eye and the right eye of the wearer HM.

The eye detecting sections 75 are disposed at the frame F. Specifically, one of the eye detecting sections 75 is disposed at one of the rims 3 (e.g., in an upper part of one of the rims 3). The other eye detecting section 75 is disposed at the other rim 3 (e.g., in an upper part of the other rim 3).

The control section 17 controls the control voltage CV of the liquid crystal layers 53 based on results of detection by the respective eye detecting sections 75.

In the above configuration, the electric potential gradients in the liquid crystal layers 53 can be controlled to change the focal lengths f of the respective optical elements LN without need of operation by the wearer HM on the operation section 19 and the operation device 200 in the second embodiment. That is, the focal lengths f of the optical elements LN can be automatically changed according to results of detection of eye movement by the respective eye detecting sections 75. Automatic change in focal lengths f can increase convenience of the wearer HM. When the focal lengths f are automatically changed, the power of each optical element LN is automatically changed.

Specifically, as illustrated in FIG. 10, the controller 55 implements an eye tracking technique to calculate a line-of-sight direction SLL of one of the eyes and a line-of-sight direction SLR of the other eye of the wearer HM based on results of detection by the respective eye detecting sections 75. The controller 55 then controls the control voltage CV of the liquid crystal layer 53 based on either or both the line-of-sight direction SLL and the line-of-sight direction SLR. In the above configuration, the electric potential gradient(s) in corresponding liquid crystal layer(s) 53 is/are controlled according to the line-of-sight direction SLL and/or the line-of-sight direction SLR. Through the above, the focal length(s) f of the optical element(s) LN is/are changed according to the line-of-sight direction SLL and/or the line-of-sight direction SLR. The controller 55 can also calculate a position of the gaze point of the wearer HM from the line-of-sight directions SLL and SLR. The gaze point refers to an intersection point of the line-of-sight directions SLL and SLR.

The first example of the eye tracking technique is to optically detect movement of the eyes by the respective eye detecting sections 75 and calculate the line-of-sight directions by the controller 55 based on the results of detection by the respective eye detecting sections 75. The following describes a corneal reflex method, a dark pupil method, a bright pupil method, and a sclera reflection method as specific examples of the first example.

In each of the corneal reflex method, the dark pupil method, and the bright pupil method, the eye detecting sections 75 each includes a light source such as a light emitting diode (LED), and a capturing section such as a camera (e.g., a video camera).

In the corneal reflex method, the light source irradiates a corresponding one of the eyes with light (e.g., infrared rays) and the capturing section captures a video of the eye. The controller 55 then detects a position of the pupil and a position of a corneal reflex image (specifically, a Purkinje image) of the light source on the corneal surface from the eye video output from the capturing section. The controller 55 further calculates a line-of-sight direction based on the respective positions of the pupil and the corneal reflex image of the light source.

In the dark pupil method, the light source is disposed at a location apart from an optical axis of a lens of the capturing section. The light source irradiates the eye with light (e.g., infrared rays), and the capturing section captures a video of the eye. A pupil region in the eye video output from the capturing section is dark. In view of the foregoing, the controller 55 extracts the dark pupil region from the video and calculates a line-of-sight direction based on movement of the pupil region.

In the bright pupil method, the light source is disposed so that an optical axis thereof is coaxial with the optical axis of the lens of the capturing section. The light source irradiates the eye with light (e.g., infrared rays), and the capturing section captures a video of the eye. A pupil region in the eye image output from the imaging section is bright. In view of the foregoing, the controller 55 extracts the bright pupil region from the video and calculates a line-of-sight direction based on movement of the pupil region.

In another example of a method utilizing the pupil region for detection of a state of an eye, light transmittance of the glasses 1A may be controlled by detecting information on degree of opening of the pupil. The above example is effective for a wearer HM who suffers from photophobia, as will be described later. In a situation in which a human looks nearby, the human's pupils typically contract. Therefore, the degree of opening of the pupils and speed of pupil opening can be converted to nearness to or farness from the point of view.

In the sclera reflection method, each of the eye detecting sections 75 includes a light emitting element such as a light emitting diode, and a photo detector such as a photodiode or a phototransistor. The light emitting element irradiates a boundary portion between the cornea and the sclera of the eye with light (e.g., infrared rays), and the photo detector receives reflected light from the boundary portion. When the eye moves, a ratio between a region where light (e.g., a light spot) covers the cornea and a region where the light covers the sclera varies to change an amount of the reflected light. In view of the foregoing, the photo detector measures an amount of reflected light and the controller 55 calculates a line-of-sight direction based on change in the amount of the reflected light.

In the second example of the eye tracking technique, a line-of-sight direction is detected by an eye potential method. Specifically, each of the eye detecting sections 75 detects a potential difference between two points around a corresponding one of the eyes and the controller 55 calculates a rotation angle of a corresponding one of the eyeballs based on the potential difference. The controller 55 then calculates a line-of-sight direction based on the rotation angle of the eyeball. In the eye potential method, each of the eye detecting sections 75 includes two electrodes attached to the two points around the eye and a potentiometer that detects a potential difference between the two electrodes.

The following describes voltage control processing based on line-of-sight directions with reference to FIG. 11. FIG. 11 is a flowchart depicting the voltage control processing. In the description with reference to FIG. 11, the difference value DFF (=V1−V2) between the first and second voltages V1 and V is referred to as a difference value DV (=v1−v2). As illustrated in FIG. 11, a routine includes Steps S1 to S13.

At Step S1, the controller 55 implements the eye tracking technique to calculate the line-of-sight directions SLL and SLR based on results of detection by the respective eye detecting sections 75. In calculating the line-of-sight directions SLL and SLR, the controller 55 calculates an angle θL between the line-of-sight direction SLL and a horizontal plane and an angle θR between the line-of-sight direction SLR and the horizontal plane.

At Step S3, the controller 55 calculates an average value θLR of the angles θL and θR.

At Step S5, the controller 55 determines whether or not the average value θLR indicates a depression angle and is equal to or larger than a specific angle θth. The specific angle θth is for example larger than 0 degrees and less than 90 degrees. The depression angle refers to a downward angle relative to the horizontal plane.

When a positive determination is made at Step S5, that is, when the average value θLR indicates a depression angle and is equal to or larger than the specific angle θth (Yes at Step S5), the routine proceeds to Step S7. The positive determination at Step S5 means that the lines of sight of the wearer HM incline downward relative to the horizontal plane. By contrast, a negative determination at Step S5 refers to determination that the lines of sight of the wearer HM are directed horizontally or incline upward relative to the horizontal plane.

At Step S7, the controller 55 determines whether or not the positive determination has been made at Step S5 in the previous turn. Step S5 in the previous turn refers to Step S5 having been executed in a previous routine.

When it is determined that the positive determination has been made at Step S5 in the previous turn (Yes at Step S5), the routine returns to Step S1.

By contrast, when it is determined that the negative determination has been made at Step S5 in the previous turn (No at Step S7), the routine proceeds to Step S9.

At Step S9, the controller 55 controls the first and second power supply circuits PW1 and PW2 so as to change the current difference value DFF between the first and second voltages V1 and V2. As a result, the focal length f of each optical element LN is changed according to the changed difference value DFF. Then, the routine returns to Step S1.

Specifically, the controller 55 controls the first and second power supply circuits PW1 and PW2 so that the difference value DFF is negative.

For example, the controller 55 controls the first and second power supply circuits PW1 and PW2 so as to change the difference value DFF from a first specific value PV1 to a second specific value PV2. In an example, the first specific value PV1 is 0 and the second specific value is negative. In the above example, when the difference value DFF is changed from the first specific value PV1 to the second specific value PV2, each optical element LN changes from an optical element functioning as neither a convex lens nor a concave lens to an optical element functioning as a convex lens. In another example, the first specific value PV1 is positive and the second specific value is negative. In the above example, when the difference value DV is changed from the first specific value PV1 to the second specific value PV2, each optical element LN changes from an optical element functioning as a concave lens to an optical element functioning as a convex lens.

By contrast, when the negative determination is made at Step S5 (No at Step S5), the routine proceeds to Step S11. The negative determination at Step S5 refers to determination that the average value θLR indicates an elevation angle or that the average θLR indicates a depression angle and is smaller than the specific angle θth. The elevation angle refers to an upward angle relative to the horizontal plane.

At Step S11, the controller 55 determines whether or not the negative determination has been made at Step S5 in the previous turn.

When it is determined that the negative determination has been made at Step S5 in the previous turn (Yes at Step S11), the routine returns to Step S1.

By contrast, when it is determined that the positive determination has been made at Step S5 in the previous turn (No at Step S11), the routine proceeds to Step S13.

At Step S13, the controller 55 controls the first and second power supply circuits PW1 and PW2 so as to change the current difference value DFF between the first and second voltages V1 and V2. As a result, the focal length f of each optical element LN is changed according to the changed difference value DFF. The routine then returns to Step S1.

Specifically, the controller 55 controls the first and second power supply circuits PW1 and PW2 so that the difference value DFF is 0 or positive.

For example, the controller 55 controls the first and second power supply circuits PW1 and PW2 to change the difference value DFF from the second specific value PV2 to the first specific value PV1. In one example, the second specific value PV2 is negative and the first specific value is 0. In the above example, when the difference value DFF is changed from the second specific value PV2 to the first specific value PV1, each optical element LN changes from an optical element functioning as a convex lens to an optical element functioning as neither a convex lens nor a concave lens. In another example, the second specific value PV2 is negative and the first specific value PV1 is positive. In the above example, when the difference value DFF is changed from the second specific value PV2 to the first specific value PV1, each optical element LN changes from an optical element functioning as a convex lens to an optical element functioning as a concave lens.

Note that Step S3 may be omitted. In a case where Step S3 is omitted, the controller 55 determines whether or not either the angle θL or the angle θR indicates a depression angle and is equal to or larger than the specific angle θth at Step S5.

As described with reference to FIG. 11, the focal length(s) f of either or both the optical elements LN can be changed according to the line-of-sight directions SLL and/or SLR without need of operation by the wearer HM on the operation section 19 and the operation device 200.

For example, in a situation in which the lines of sight of the wearer HM with an emmetropic eye straight are directed horizontally or upward of the horizontal plane (e.g., in a situation in which the wearer HM looks at an object located a middle or long distance apart from the wearer HM), each optical element LN changes from an optical element LN functioning as a convex lens to an optical element functioning as neither a convex lens nor a concave lens (Step S13) or each optical element LN is kept functioning as neither a convex lens nor a concave lens (Yes at Step S11). By contrast, for example, in a situation in which the lines of sight of the wearer HM are directed downward of the horizontal plane (e.g., in a situation in which the wearer HM looks at an object located a short distance apart from the wearer HM), each optical element LN changes from an optical element functioning as neither a convex lens nor a concave lens to an optical element functioning as a convex lens (Step S9) or is kept functioning as a convex lens (Yes at Step S7).

In the above configuration, the glasses 1A can be automatically changed to glasses for far or middle distance or glasses for short distance without need for the wearer HM with an emmetropic eye to operate the operation section 19 and the operation device 200.

For example, in a situation in which the lines of sight of a wearer HM who suffers from myopia or myopia and hyperopia are directed horizontally or upward of the horizontal plane, each optical element LN changes from an optical element functioning as a convex lens to an optical element functioning as a concave lens (Step S13) or is kept functioning as a concave lens (Yes at Step S11). By contrast, in a situation for example in which the lines of sight of a wearer HM who suffers from myopia or myopia and hyperopia are directed downward of the horizontal plane, each optical element LN changes from an optical element functioning as a concave lens to an optical element functioning as a convex lens (Step S9) or is kept functioning as a convex lens (Yes at Step S7).

In the above configuration, the glasses 1A can be automatically changed to glasses for far or middle distance or glasses for short distance without need for the wearer HM 1 who suffers from myopia or myopia and hyperopia to operate the operation section 19 and the operation device 200.

In addition, the second embodiment provides advantages similar to those in the first embodiment.

Furthermore, the lines of sight of a human looking at an object located within a short distance tend to be directed inward of neutral positions thereof. By contrast, the lines of sight of a human looking at an object located within a middle to far distance tend to be directed outward of neutral positions thereof. Nearness and farness control can be achieved by utilizing the above tendencies. The "neutral position" refers to a position where a line of sight of one of human's eyes and that of the other eye thereof are substantially parallel to each other and both the lines of sight are directed right in front.

It is possible that the controller 55 controls the first and second power supply circuits PW1 and PW2 so that the difference value DFF becomes 0 at Step S9 in FIG. 11 and controls the first and second power supply circuits PW1 and PW2 so that the difference value DFF becomes positive at Step S13.

The glasses 1A may include a head detecting section that detects movement of the head of the wearer HM. In the above case, the control section 17 may control the control voltage CV to control the electric potential gradient of the liquid crystal layer 53 based on a result of detection by the head detecting section. The head detecting section may be for example an acceleration sensor and/or a gyro sensor.

The optical elements LN may be employed in glasses for vertical reality or glasses for augmented reality (AR). In either case, focal point control suitable for eye characteristics of a wearer HM can be achieved all the time without need of a complicate lens moving mechanism or the like.

(Third Embodiment)

Figure 12:
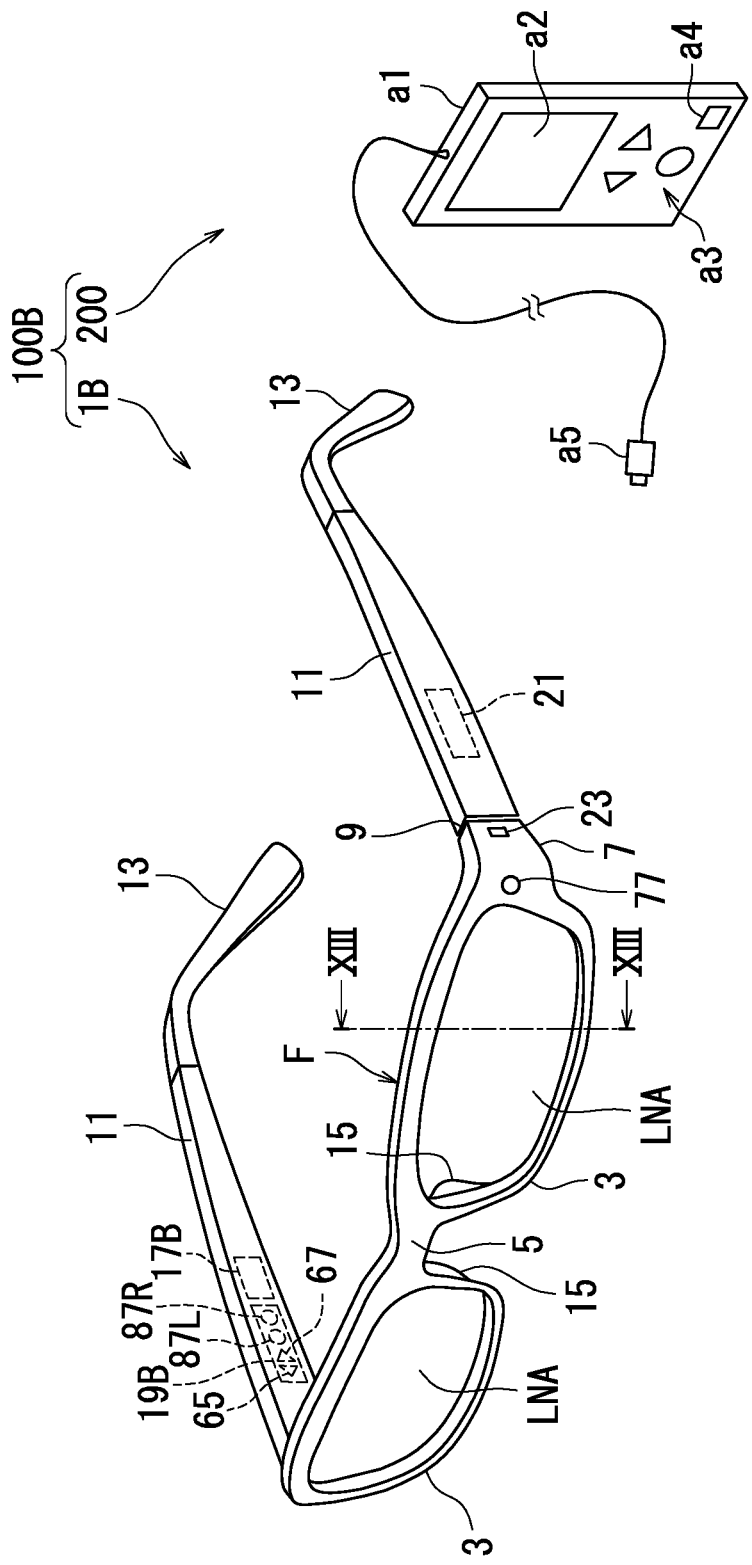
FIG. 12 is a perspective view illustrating an eyeglass system according to a third embodiment of the present invention.
Figure 13A:
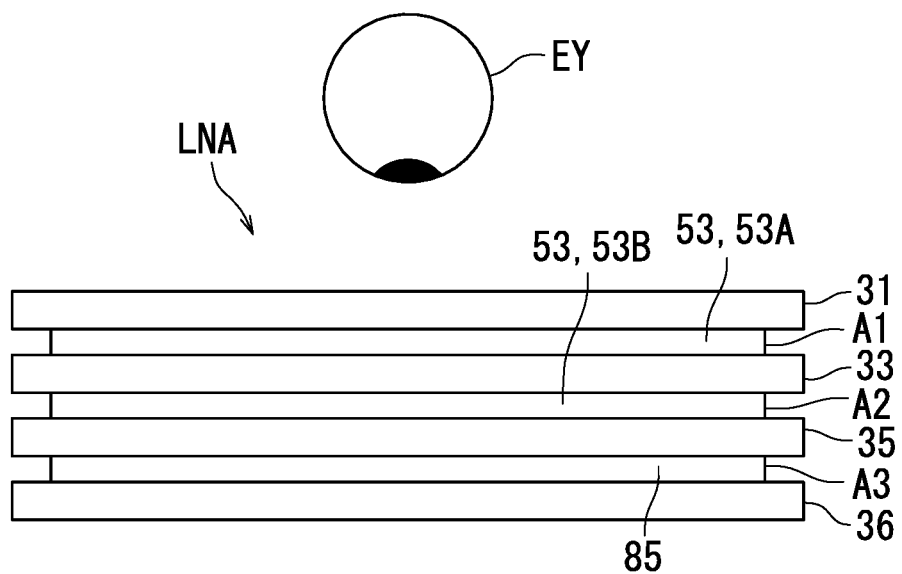
FIG. 13A is a schematic cross-sectional view of an optical element taken along a line XIII-XIII in FIG. 12.
Figure 13B:
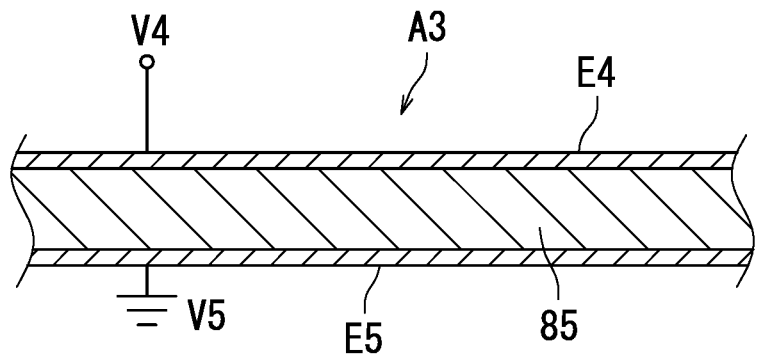
FIG. 13B is a cross-sectional view illustrating a light transmitting unit according to the third embodiment.
Figure 14:
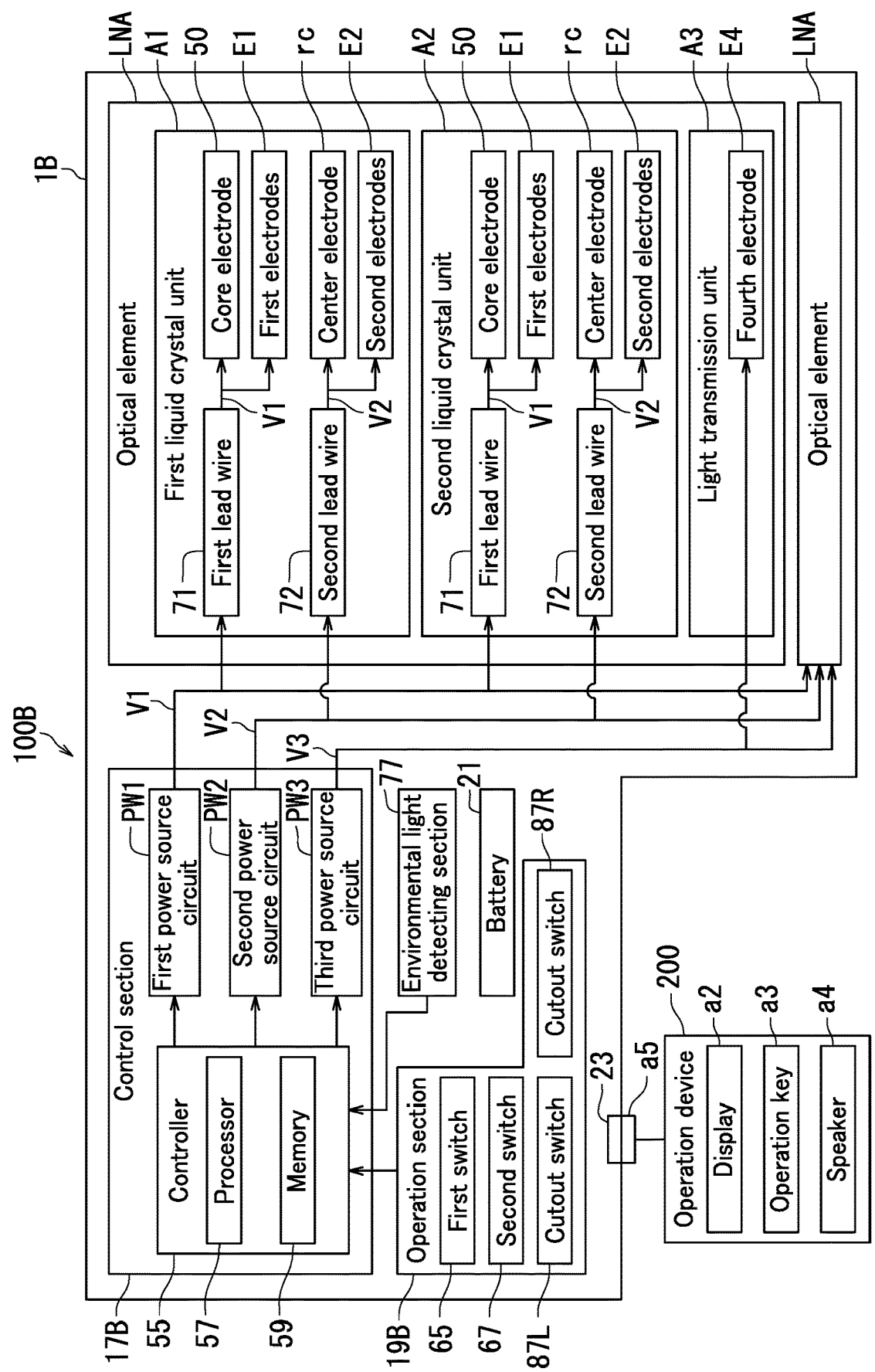
FIG. 14 is a diagram illustrating an electrical configuration of the eyeglass system according to the third embodiment.

The following describes an eyeglass system 100B according to a third embodiment of the present invention with reference to FIGS. 12 to 14. A main difference of the eyeglass system 100B from the eyeglass system 100 according to the first embodiment lies in that light transmittance is controllable. The following mainly describes differences of the third embodiment from the first embodiment.

FIG. 12 is a perspective view illustrating the eyeglass system 100B. As illustrated in FIG. 12, the eyeglass system 100B includes glasses 1B and the operation device 200. In addition to the elements of the glasses 1 in the first embodiment, the glasses 1B further include an environmental light detecting section 77. The environmental light detecting section 77 detects brightness of a surrounding environment of the glasses 1B. The environmental light detecting section 77 is for example an environmental light sensor that detects a light quantity of the surrounding environment of the glasses 1B. The environmental light detecting section 77 is disposed at the frame F. Specifically, the environmental light detecting section 77 is disposed at one of the rims 3 (e.g., an outer edge of one of the rims 3 located outward of the bridge 5). The glasses 1B includes a pair of optical elements LNA rather than the pair of optical elements LN of the glasses 1 in the first embodiment, a control section 17B rather than the control section 17 of the glasses 1, and an operation section 19B rather than the operation section 19 of the glasses 1. The optical elements LNA each function as a lens.

The following describes the optical elements LN with reference to FIGS. 13A and 13B. FIG. 13A is a cross-sectional view of one of the optical elements LNA taken along a line XIII-XIII in FIG. 12. In addition to the elements of each optical element LN in the first embodiment, the optical element LNA further includes a fourth substrate 36 and a light transmission unit A3 capable of controlling light transmittance, as illustrated in FIG. 13A. The shape, material, and color of the fourth substrate are the same as those of the first substrate 31. The light transmission unit A3 is disposed between the third and fourth substrates 35 and 36. The first liquid crystal unit A1 is located opposite to one of the eyes EY of the wearer HM with the first substrate 31 therebetween.

FIG. 13B is a cross-sectional view illustrating the light transmission unit A3 in FIG. 13A. As illustrated in FIG. 13B, the light transmission unit A3 includes a fourth electrode E4, a light transmitting layer 85, and a fifth electrode E5. A fourth voltage V4 is applied to the fourth electrode E4. The fourth voltage V4 is a direct current voltage or an alternating current voltage. The fourth electrode E4 has a sheet-like shape and is in a single-layer structure. A fifth voltage V5 is applied to the fifth electrode E5. The fifth electrode E5 is grounded and the fifth voltage V5 is set to a ground potential (0 V) in the third embodiment. The fifth electrode E5 has a sheet-like shape and is in a single-layer structure.

The light transmitting layer 85 transmits light. The light transmittance of the light transmitting layer 85 can be controlled. The light transmittance refers to for example a ratio (=Ib/Ia) of a light quantity Ib of light exiting from the light transmitting layer 85 to a light quantity Ia of light entering the light transmitting layer 85. The light transmitting layer 85 is disposed between the fourth electrode E4 and the fifth electrode E5.

The light transmitting layer 85 contains for example an electrochromic material. The electrochromic material refers to a material capable of reversibly changing light transmittance through voltage application. Specifically, the electrochromic material is a material that is colored or decolored by reversely changing an absorption spectrum of visible light through voltage application.

Examples of the electrochromic material include inorganic electrochromic compounds, organic electrochromic compounds, and conductive macromolecules exhibiting electrochromism. Specific examples of electrochromic materials that can be used include pigment-based electrochromic compounds, polymer-based electrochromic compounds, metal complex-based electrochromic compounds, metal oxide-based electrochromic compounds, and carbon-based materials.

Examples of the pigment-based compounds and polymer-based compounds include low molecular organic electrochromic compounds of azobenzene base, anthraquinone base, diarylethene base, dihydroprene base, dipyridine base, styryl base, styryl spiropyran base, spirooxazine base, supirochiopiran base, thioindigo base, tetrathiafulvalene base, terephthalic acid base, triphenylmethane base, triphenylamine base, naphthopyran base, viologen base, pyrazoline base, phenazine base, phenylenediamine base, phenoxazine base, phenothiazine base, phthalocyanine base, fluoran base, fulgide base, benzopyran base, and metallocene base, and conductive high-molecular compounds such as polyaniline of polythiophene.

Examples of the metal complex-based compounds include iron cyanide complex, ruthenium cyanide complex, osmium cyanide complex, tungsten oxalate complex, and rare-earth diphthalocyanine complex. Examples of the metal oxide-based compounds include tungsten oxide, molybdenum oxide, iridium oxide, indium oxide, titanium oxide, nickel oxide, and vanadium oxide. Examples of the carbon-based materials include functional grapheme derivatives, conductive carbon materials such as carbon nanotube, and other carbon allotropes.

The following describes operation of the glasses 1B with reference to FIG. 14. FIG. 14 is a diagram illustrating an electrical configuration of the eyeglass system 100B. In addition to the elements of the control section 17 in the first embodiment, the control section 17B of the glasses 1B further includes a third power supply circuit PW3, as illustrated in FIG. 14. The operation section 19B further includes a cutout switch 87L and a cutout switch 87R in addition to the elements of the operation section 19 in the first embodiment.

The controller 55 controls the third power supply circuit PW3 in response to the internal operation signal from the operation section 19 or the external operation signal from the operation device 200. Specifically, the processor 57 executes computer programs stored in the memory 59 to control the third power supply circuit PW3. The third power supply circuit PW3 under control by the controller 55 applies a fourth voltage V4 to the fourth electrode E4 of the light transmission unit A3. As a result, the fourth voltage V4 is applied to the light transmitting layer 85 through the fourth electrode E4.

That is, the controller 55 controls the fourth voltage V4 through the third power supply circuit PW3 and applies the fourth voltage V4 to the light transmitting layer 85 through the fourth electrode E4. Light transmittance of the light transmitting layer 85 is controlled through application of the fourth voltage V4 to the light transmitting layer 85. The light transmittance of the light transmitting layer 85 varies according to the magnitude of the fourth voltage V4.

For example, when the wearer HM pushes the cutout switch 87L, the cutout switch 87L transmits a third internal operation signal to the controller 55. Further, when the wearer HM pushes the cutout switch 87L on condition that the light transmittance of the light transmitting layer 85 is almost 0%, the cutout switch 87L transmits a fourth internal operation signal to the controller 55. Upon receiving the third or fourth internal operation signal, the controller 55 starts controlling the fourth voltage V4 to be applied to the fourth electrode E4 of one of the optical elements LNA (also referred to below as an "optical element "LNAL"). The cutout switch 87R operates in the same manner as the cutout switch 87L. However, when the cutout switch 87R is pushed, the controller 55 starts controlling the fourth voltage V4 to be applied to the fourth electrode E4 of the other optical element LNA (also referred to below as an "optical element LNAR").

For example, upon receiving the third internal operation signal from the cutout switch 87L, the controller 55 controls the fourth voltage V4 through the third power supply circuit PW3 so that the light transmitting layer 85 of the optical element LNAL has a minimum light transmittance (e.g., approximately 0%). As a result, the light transmittance of the light transmitting layer 85 of the optical element LNAL is set to the minimum value (e.g., approximately 0%).

For example, upon receiving the fourth internal operation signal from the cutout switch 87L, the controller 55 controls the fourth voltage V4 through the third power supply circuit PW3 so that the light transmitting layer 85 of the optical element LNAL has a light transmittance larger than approximately 0%. For example, upon receiving the fourth internal operation signal from the cutout switch 87L, the controller 55 controls the fourth voltage V4 through the third power supply circuit PW3 so that the light transmitting layer 85 of the optical element LNAL has a maximum light transmittance (e.g., approximately 100%). For example, upon receiving the fourth internal operation signal from the cutout switch 87L, the controller 55 controls the fourth voltage V4 through the third power supply circuit PW3 so that the light transmitting layer 85 of the optical element LNAL has a light transmittance that is a transmittance before being set to approximately 0%.

Furthermore, the controller 55 controls the fourth voltage V4 for each of the paired optical elements LNA through control on the third power supply circuit PW3 based on a result of detection by the environmental light detecting section 77. Through the above, the light transmittance of the light transmitting layer 85 of each of the paired optical elements LNA can be automatically controlled according to the brightness of the surrounding environment of the glasses 1B without need for the wearer HM to operate the operation section 19B and the operation device 200. For example, the controller 55 controls the fourth voltage V4 so that the light transmittance of the light transmitting layer 85 of each optical element LNA is smaller as the surrounding environment of the glasses 1B is brighter (i.e., as the light quantity of the surrounding environment is larger).

As described with reference to FIGS. 13A and 13B, the light transmittance of the light transmitting layers 85 can be easily controlled by controlling the fourth voltage V4 in the third embodiment. That is, the transmittance of each optical element LNA can be easily controlled. Thus, the glasses 1B can be used for various purposes.

For example, the glasses 1B can be applied to treatment for amblyopia and squint. Specifically, in a situation in which the wearer HM suffers from an amblyopia or strabismus, the controller 55 controls the fourth voltage V4 so that the light transmittance of the light transmitting layer 85 of one of the optical elements LNA corresponding to a emmetropicone of the eyes is set to almost 0%. As a result, the optical element LNA functions as an eyepatch to block light entering the eye corresponding to the optical element LNA. Therefore, the glasses 1B are useful for treatment for amblyopia and strabismus. It is unnecessary to wear an eyepatch, which can reduce bother for the wearer HM.

The controller 55 can measure a time during which the light transmittance of the light transmitting layer 85 is almost 0% (also referred to below as an "eyepatch functioning time") and store information on the eyepatch functioning time. The controller 55 can transmit the information on the eyepatch functioning time to the operation device 200 via the terminals 23 and a5. The operation device 200 (specifically, the memory of the operation device 200) can store the information on the eyepatch functioning time. In the above configuration, a wearer HM who suffers from amblyopic or strabismus or a person concerned to the wearer HM (e.g., a guardian or a health care worker) can easily manage a time in which the wearer HM receives treatment for amblyopia or strabismus using the optical element LNA functioning as an eyepatch.

The environmental light detecting section 77 is provided in the third embodiment. In the above configuration, the light transmittance of the light transmitting layer 85 of each optical element LNA can be automatically controlled according to the brightness of the surrounding environment of the glasses 1B. That is, the light quantity of light entering the eyes of the wearer HM can be automatically controlled. It is accordingly not necessary to operate the glasses 1B, which can reduce bother for the wearer HM. In particular, the glasses 1B are useful for a wearer HM suffering from photophobia. Because, the fourth voltage V4 is automatically controlled so that the light transmittance of the light transmitting layer 85 is smaller as the surrounding environment of the glasses 1B is brighter without need for the wearer HM to operate the operation section 19B and the operation device 200.

It is not necessary to provide a polarizing plate in the third embodiment. Therefore, the light transmittance of each optical element LNA can be set to 99% or larger to maximum.

In addition, the third embodiment provides advantages similar to those in the first embodiment.

Note that the operation section 19B may include a third switch and a fourth switch. For example, the controller 55 controls the fourth voltage V4 through the third power supply circuit PW3 so as to increase the light transmittance of the light transmitting layer 85 in response to the third switch being pushed. Thus, the light transmittance of the light transmitting layer 85 can be increased. For example, the controller 55 controls the fourth voltage V4 through the third power supply circuit PW3 so as to decrease the light transmittance of the light transmitting layer 85 in response to the fourth switch being pushed. Thus, the light transmittance of the light transmitting layer 85 can be decreased. For example, when a wearer HM who suffers from photophobia operates the third or fourth switch, the light transmittance of the light transmitting layer 85 can be manually adjusted so as to be suitable for the wearer HM.

(Fourth Embodiment)

Figure 15:
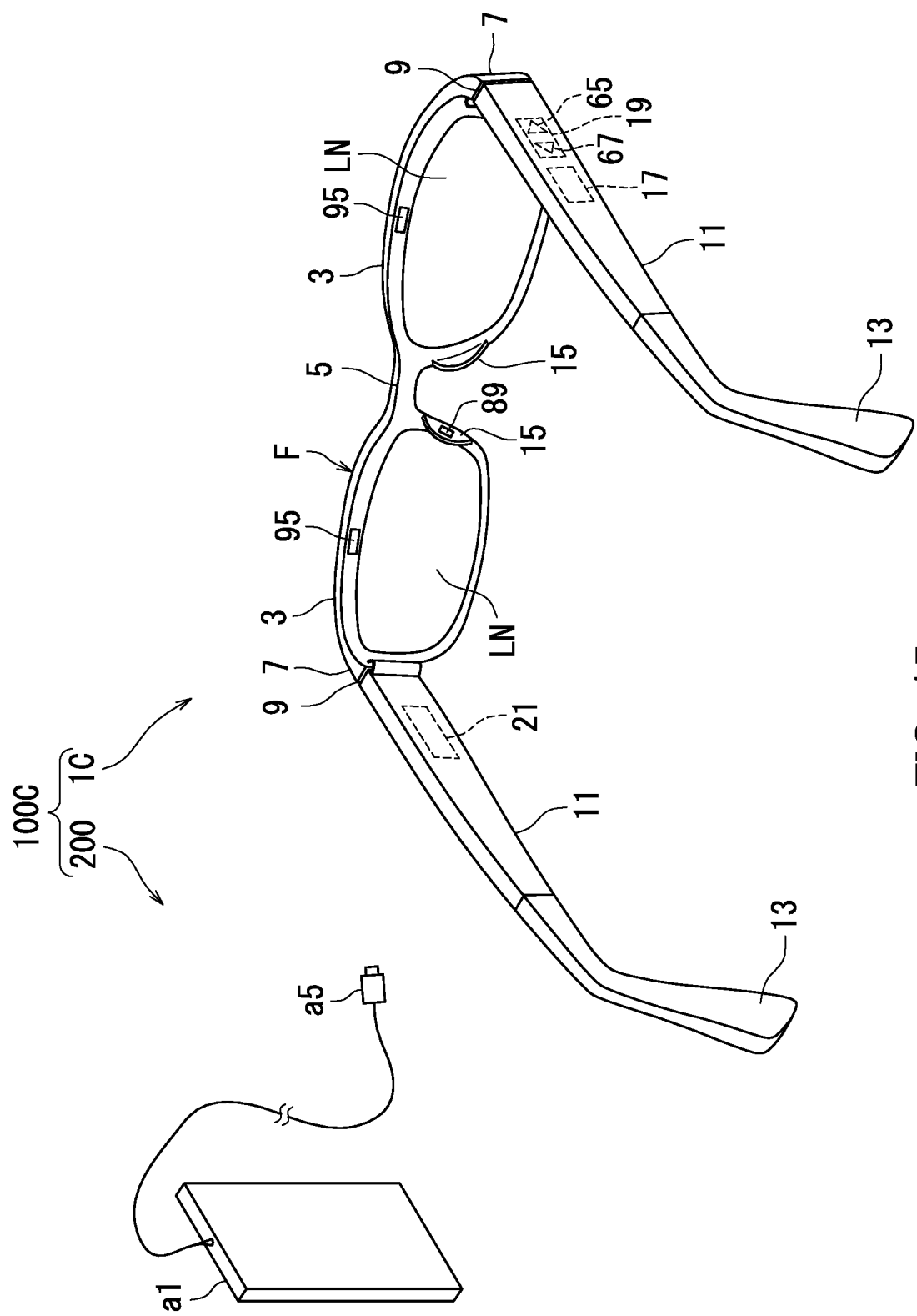
FIG. 15 is a perspective view illustrating an eyeglass system according to a fourth embodiment of the present invention.
Figure 16:
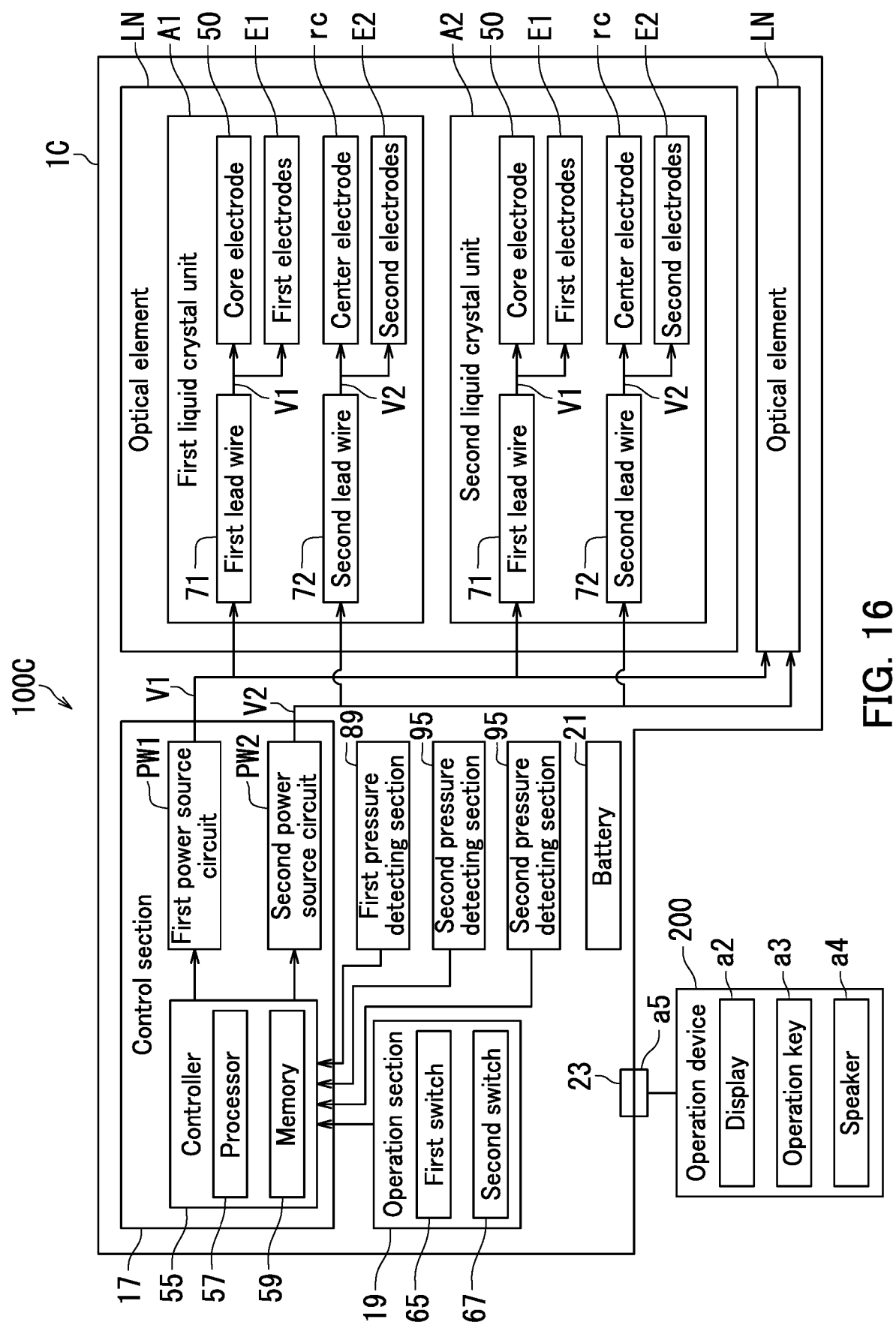
FIG. 16 is a diagram illustrating an electrical configuration of the eyeglass system according to the fourth embodiment.

The following describes an eyeglass system 100C according to a fourth embodiment of the present invention with reference to FIGS. 15 and 16. A main difference of the eyeglass system 100C from the eyeglass system 100 in the first embodiment lies in that pressure is detected. The following mainly describes differences of the fourth embodiment from the first embodiment.

FIG. 15 is a perspective view illustrating the eyeglass system 100C. As illustrated in FIG. 15, the eyeglass system 100C includes glasses 1C and the operation device 200. In addition to the elements of the glasses 1 in the first embodiment, the glasses 1C further includes a first pressure detecting section 89 (pressure detecting section) and a pair of second pressure detecting sections 95 (a pair of pressure detecting sections).

The first pressure detecting section 89 detects pressure applied to the first pressure detecting section 89. The first pressure detecting section 89 is disposed at the frame F. Specifically, the first pressure detecting section 89 is disposed at one of the pair of nose pads 15. Further specifically, the first pressure detecting section 89 is disposed on a surface of one of the nose pads 15 located opposite to the other nose pad 15.

In the above configuration, when the wearer HM puts on the glasses 1C, the nose of the wearer HM pushes the first pressure detecting section 89 to cause the first pressure detecting section 89 to detect pressure. A situation in which the first pressure detecting section 89 detects pressure in the above state means a situation in which the wearer HM puts on the glasses 1C. By contrast, when the wearer HM takes off the glasses 1C, the pressure to the first pressure detecting section 89 by the nose of the wearer HM is released, so that the first pressure detecting section 89 detects no pressure. A situation in which the first pressure detecting section 89 detects no pressure in the above state means a situation in which the wearer HM takes off the glasses 1C.

Each of the second pressure detecting sections 95 detects pressure applied to the second pressure detecting section 95. The paired second pressure detecting sections 95 are disposed at the frame F. Specifically, one of the paired second pressure detecting sections 95 is disposed at one of the rims 3 (e.g., an upper part of one of the rims 3). The other second pressure detecting section 95 is disposed at the other rim 3 (e.g., an upper part of the other rim 3).

In the above configuration, when a wearer HM with an eyepatch puts on the glasses 1C, the eyepatch pushes one of the second pressure detecting sections 95 to cause the second pressure detecting section 95 to detect pressure. A situation in which the second pressure detecting section 95 detects pressure in the above state means a situation in which the wearer HM with an eyepatch puts on the glasses 1C. By contrast, when the wearer HM takes off the glasses 1C, the pressure to the second pressure detecting section 95 by the eyepatch is released, so that the second pressure detecting section 95 detects no pressure. A situation in which the second pressure detecting sections 95 detect no pressure in the above state means a situation in which the wearer HM with the eyepatch takes off the glasses 1C.

For example, a situation in which the first pressure detecting section 89 detects pressure while the second pressure detecting sections 95 detect no pressure means a situation in which a wearer HM with no eyepatch wears the glasses 1C.

The first pressure detecting section 89 and the second pressure detecting sections 95 each are for example a pressure sensor. The pressure sensor is for example a resistance strain gauge pressure sensor, a semiconductor piezoresistive sensor, an electrostatic capacitance sensor, or a silicon resonant sensor for pressure detection.

The following describes operation of the glasses 1C with reference to FIG. 16. FIG. 16 is a diagram illustrating an electrical configuration of the eyeglass system 100C. As illustrated in FIG. 16, the control section 17 of the glasses 1C measures and store, based on a result of detection by the first pressure detecting section 89, a time period from a time point when the first pressure detecting section 89 detects pressure to a time point when it does not detect the pressure, that is, a time period during which the glasses 1C are worn. The control section 17 further measures and store, based on results of detection by the second pressure detecting sections 95, a time period from a time point when one of the second pressure detecting sections 95 detects pressure to a time point when it does not detect the pressure, that is, a time period during which the glasses 1C are worn while an eyepatch is worn.

Specifically, the controller 55 determines whether or not a level of an output signal from the first pressure detecting section 89 is equal to or larger than a first threshold value. The controller 55 measures a time period from a time point when it is determined that the level of the output signal from the first pressure detecting section 89 is equal to or larger than the first threshold value to a time point when it is determined that the level of the output signal therefrom is less than the first threshold value (also referred to below as a "glasses wearing time"), and stores information on the glasses wearing time. Determination that the level of the output signal from the first pressure detecting section 89 is equal to or larger than the first threshold value means a situation in which the first pressure detecting section 89 detects pressure as a result of the wearer HM putting on the glasses 1C. By contrast, determination that the level of the output signal from the first pressure detecting section 89 is less than the first threshold value means a situation in which the first pressure detecting section 89 detects no pressure as a result of the wearer HM taking off the glasses 1C. The controller 55 then transmits the information on the glasses wearing time to the operation device 200 via the terminals 23 and a5. The operation device 200 (specifically, the memory of the operation device 200) stores the information on the glasses wearing time.

In the above configuration, a wearer HM or a person concerned to the wearer HM can easily manage the glasses wearing time of the wearer HM in the fourth embodiment. For example, in a situation in which the glasses 1C are used for treatment or vision training, the wearer HM or the person concerned to the wearer HM (e.g., a guardian or a health care worker) can easily manage a time for the treatment or the vision training according to the glasses wearing time.

In addition to the training utilizing such a log recording function, training can be provided that utilizes short-range wireless communication by Bluetooth (registered Japanese trademark) or the like between application installed in a smartphone and the glasses 1C that are variable in power. For example, when application for amblyopia training is installed in a smartphone, such training can be provided by running the application on a smartphone screen. Furthermore, training using a system with a head mounted display can be provided in combination with the above-described virtual reality (VR) or augmented reality (AR) system. In the above case, the glasses 1C may be used in combination. Alternatively, only the optical elements LN are disposed at the head mounted display to allot functions such as focal control, light deflection control, and light transmittance control to the optical elements LN.

Furthermore, a system constituting a program for positively improving a lifestyle can be provided by installing artificial intelligence in the application. For example, it is possible to invite to voluntarily wear the glasses 1C during treatment, suggest taking a rest on detection of eyestrain, and propose movement to a dark place when the wearer HM stays in a blight place too long.

Further, the controller 55 determines whether or not the level of an output signal from each second pressure detecting section 95 is equal to or larger than a second threshold value. The controller 55 measures a time period from a time point when it is determined that the level of the output signal from the second pressure detecting section 95 is equal to or larger than the second threshold value to a time point when it is determined that the level of the output signal therefrom is less than the second threshold value (also referred to below as a "eyepatch wearing time"), and stores information on the eyepatch wearing time. Determination that the level of the output signal from one of the second pressure detecting sections 95 is equal to or larger than the second threshold value means a situation in which the one second pressure detecting section 95 detects pressure as a result of the wearer HM with an eyepatch putting on the glasses 1C. By contrast, determined that the level of the output signal from each of the second pressure detecting sections 95 is less than the second threshold value means a situation in which the second pressure detecting sections 89 detect no pressure as a result of the wearer HM with the eyepatch taking off the glasses 1C. The controller 55 then transmits the information on the eyepatch wearing time to the operation device 200 via the terminals 23 and a5. The operation device 200 (specifically, the memory of the operation device 200) stores the information on the eyepatch wearing time.

In the above configuration, a wearer HM or a person concerned to the wearer HM can easily manage the eyepatch wearing time of the wearer HM in the fourth embodiment. For example, in a situation in which an eyepatch is used for treatment for amblyopia or strabismus, a wearer HM or a person concerned to the wearer HM (e.g., a guardian or a health care worker) can easily manage a time for treatment for amblyopia or strabismus using an eyepatch according to the eyepatch wearing time.

In addition, the fourth embodiment provides advantages similar to those in the first embodiment.

(Fifth Embodiment)

Figure 17:
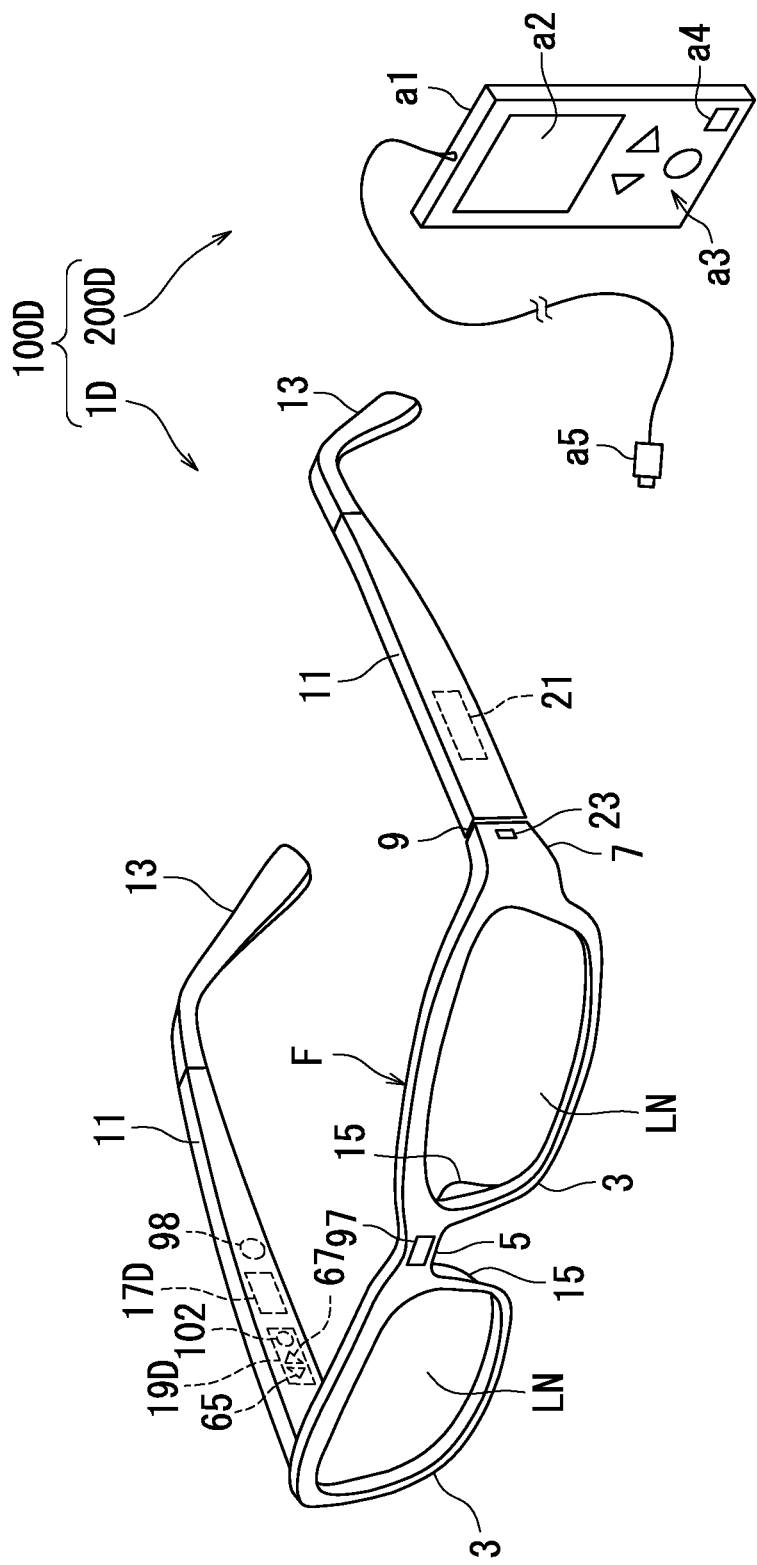
FIG. 17 is a perspective view illustrating an eyeglass system according to a fifth embodiment of the present invention.
Figure 18:
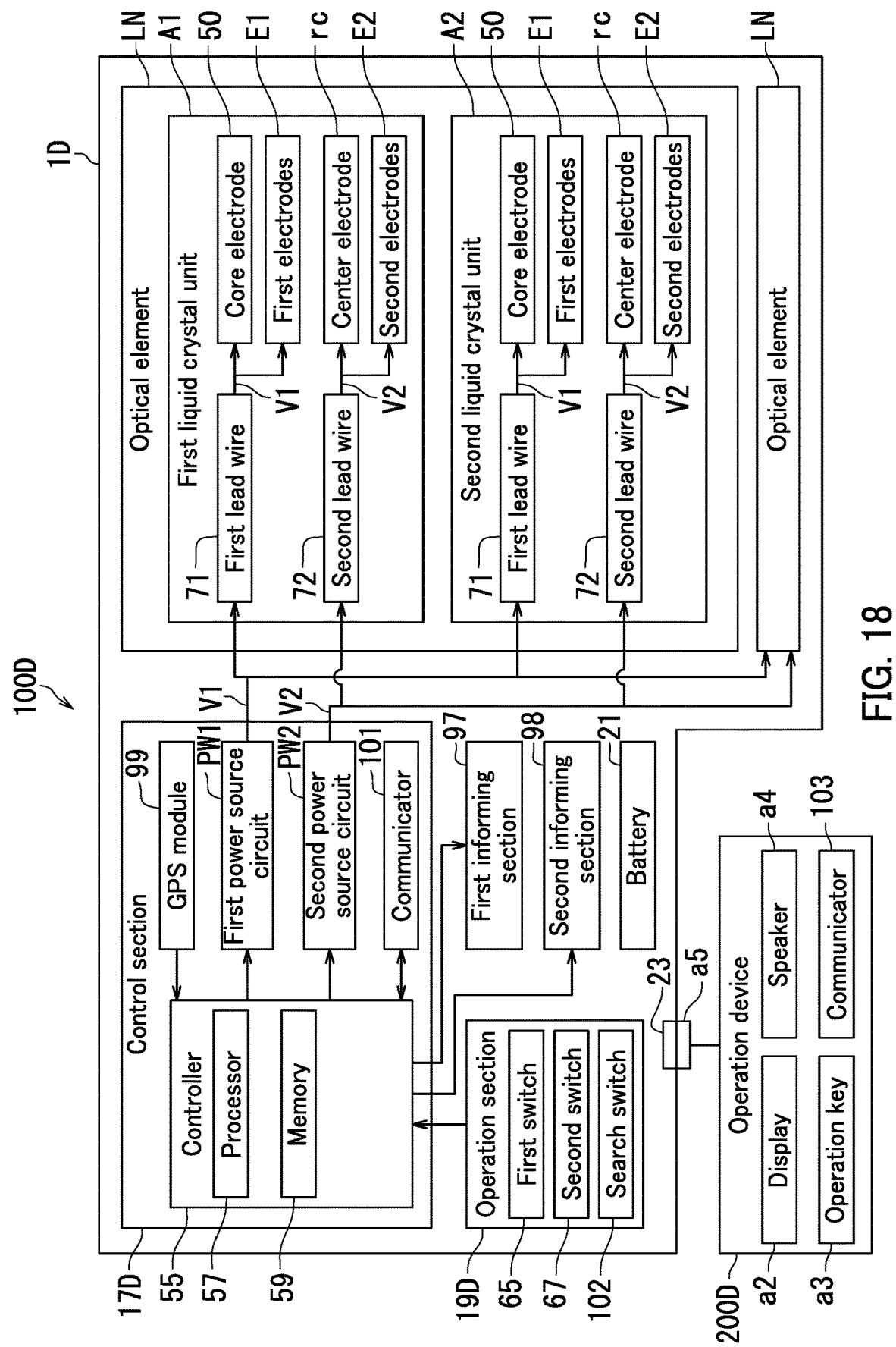
FIG. 18 is a diagram illustrating an electrical configuration of the eyeglass system according to the fifth embodiment.

The following describes an eyeglass system 100D according to a fifth embodiment of the present invention with reference to FIGS. 17 and 18. A main difference of the eyeglass system 100D from the eyeglass system 100 in the first embodiment lies in a function of informing the whereabouts of the eyeglass system 100D. The following mainly describes differences of the fifth embodiment from the first embodiment.

FIG. 17 is a perspective view illustrating the eyeglass system 100D. As illustrated in FIG. 17, the eyeglass system 100D includes glasses 1D and an operation device 200D. In addition to the elements of the glasses 1 in the first embodiment, the glasses 1D further include a first informing section 97 (informing section) and a second informing section 98 (informing section).

The first and second informing sections 97 and 98 each inform the whereabouts of the glasses 1D in response to a first specific signal FS (specific signal) being wirelessly transmitted. The first and second informing sections 97 and 98 are disposed at the frame F.

Specifically, the first informing section 97 informs the whereabouts of the glasses 1D by emitting light in response to the first specific signal FS. The first informing section 97 is for example a light emitting element such as a light emitting diode (ELD). The first informing section 97 is disposed at the bridge 5. The second informing section 98 informs the whereabouts of the glasses 1D by outputting sound in response to the first specific signal FS. The second informing section 98 is for example a speaker. The second informing section 98 is disposed at one of the temples 11.

The glasses 1D includes a control section 17D rather than the control section 17 of the glasses 1 in the first embodiment, and an operation section 19D rather than the operation section 19 of the glasses 1 therein.

Upon receiving the first specific signal FS wirelessly transmitted from the operation device 200D, the control section 17D controls the first informing section 97 to emit light and the second informing section 98 to output sound. In response to the above control, the first informing section 97 emits light and the second informing section 98 outputs sound.

According to the fifth embodiment, when a possessor of the glasses 1D operates the operation device 200D to transmit the first specific signal FS in a situation in which the whereabouts of the glasses 1D is unknown, the whereabouts of the glasses 1D can be easily recognized. As a result, a situation in which the glasses 1D are lost can be prevented. In addition, the fifth embodiment provides advantages similar to those in the first embodiment.

The following describes operation of the glasses 1D with reference to FIG. 18. FIG. 18 is a diagram illustrating an electrical configuration of the eyeglass system 100D. In addition to the elements of the control section 17 in the first embodiment, the control section 17D of the glasses 1D further includes a global positioning system (GPS) module 99 and a communicator 101, as illustrated in FIG. 18. The operation section 19D further includes a search switch 102 in addition to the elements of the operation section 19 in the first embodiment. The operation device 200D further includes a communicator 103 in addition to the elements of the operation device 200 in the first embodiment.

The communicator 101 and the communicator 103 communicate with each other wirelessly. The communicator 101 receives the first specific signal FS from the communicator 103. Upon the communicator 101 receiving the first specific signal FS, the controller 55 controls the first informing section 97 to emit light and the second informing section 98 to output sound. In the above configuration, the whereabouts of the glasses 1D can be easily recognized.

The GPS module 99 detects a location of the glasses 1D and transmits information on the location of the glasses 1D to the controller 55. Upon the communicator 101 receiving the first specific signal FS, the controller 55 acquires the information on the location of the glasses 1D from the GPS module. The controller 55 then controls the communicator 101 to transmit the information on the location of the glasses 1D to the operation device 200D. In response, the communicator 101 transmits the information on the location of the glasses 1D to the operation device 200D. The communicator 103 of the operation device 200D receives the information on the location of the glasses 1D. The display a2 then displays the information on the location of the glasses 1D.

In the above configuration, the possessor of the glasses 1D who does not recognize the whereabouts of the glasses 1D can easily recognize the information on the location of the glasses 1D by transmitting the first specific signal FS through operation on the operation device 200D in the fifth embodiment. As a result, a situation in which the glasses 1D are lost can be prevented further reliably.

For example, when the possessor of the glasses 1D operates the operation key a3 of the operation device 200D, the communicator 103 transmits the first specific signal FS to the communicator 101.

In response to the internal operation signal from the operation section 19, the controller 55 controls the communicator 101 to transmits a second specific signal SS to the operation device 200D. In response, the communicator 103 of the operation device 200D receives the second specific signal SS. Upon the communicator 103 receiving the second specific signal SS, the display a2 emits light and the speaker a4 outputs sound.

In the above configuration, in a situation in which the whereabouts of the operation device 200D is unknown, a possessor of the operation device 200D can easily recognize the whereabouts of the operation device 200D by transmitting the second specific signal SS through operation on the operation section 19D of the glasses 1D.

For example, when the possessor of the operation device 200D pushes the search switch 102, the search switch 102 transmits a fifth internal operation signal to the controller 55. Upon receiving the fifth internal operation signal, the controller 55 controls the communicator 101 to transmit the second specific signal SS to the operation device 200D.

(Sixth Embodiment)

The following describes an eyeglass system 100 (also referred to below as an eyeglass system 100E") according to a sixth embodiment of the present invention with reference to FIGS. 1 and 19A to 22. A main difference of the eyeglass system 100E from the eyeglass system 100 in the first embodiment lies in that light exits after being deflected. Deflection of light refers to a phenomenon in which a plurality of light rays having a substantially equal incident angle are refracted at a substantially equal refracting angle and then exit. The following mainly describes differences of the sixth embodiment from the first embodiment.

In the description in the sixth embodiment, the eyeglass system 100 is replaced by the eyeglass system 100E, as illustrated in FIG. 1. The eyeglass system 100E includes the glasses 1 (also referred to below as "glasses 1E") and the operation device 200. The glasses 1E include a pair of optical elements LNB rather than the pair of optical elements LN of the glasses 1 in the first embodiment. The optical elements LNB each function as a deflection element.

Figure 19A:
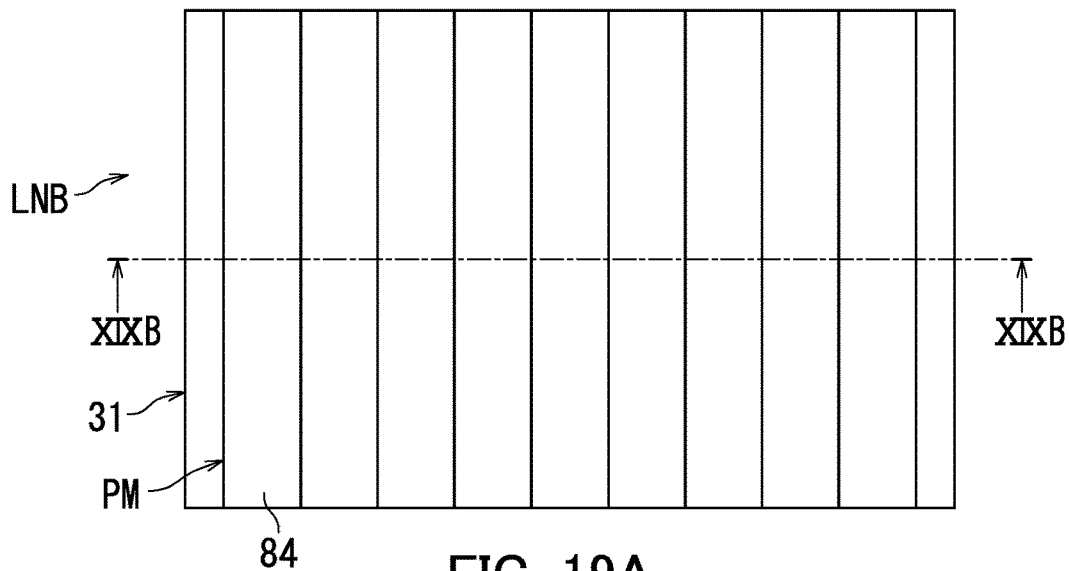
FIG. 19A is a plan view illustrating an optical element according to a sixth embodiment of the present invention.
Figure 19B:
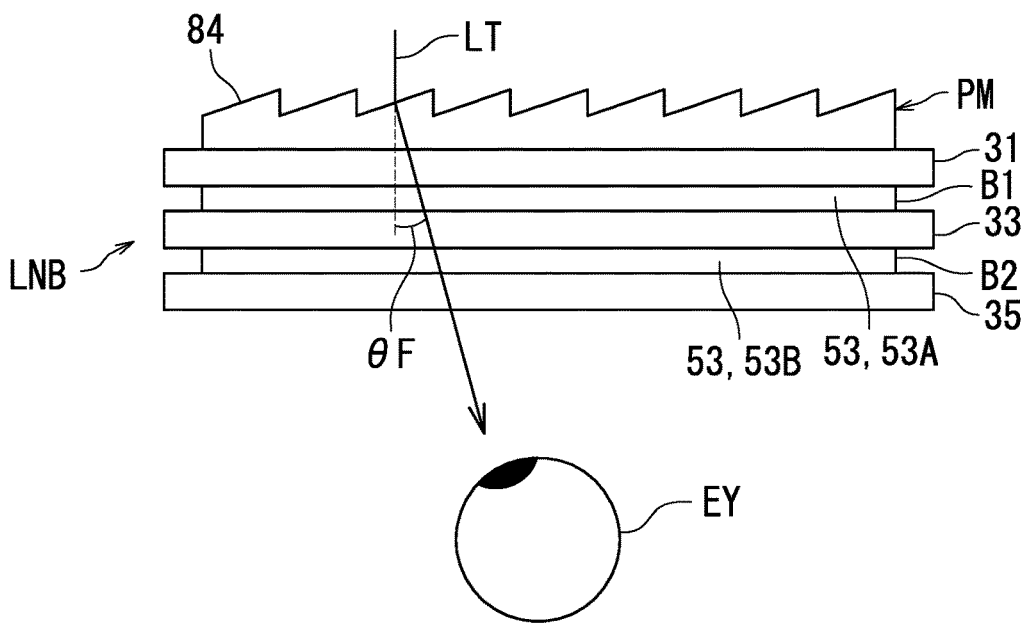
FIG. 19B is a schematic cross-sectional view of the optical element taken along a line XIXB-XIXB in FIG. 19.

FIG. 19A is a plan view illustrating one of the optical elements LNB. FIG. 19B is a schematic cross-sectional view of the optical element LNB taken along a line XIXB-XIXB in FIG. 19A. FIG. 19B illustrates a section of the optical element LNB taken along the line II-II in FIG. 1 by which the optical element LN is replaced.

In addition to the elements of the optical elements LN in the first embodiment, each of the optical elements LNB further includes an optical member PM in a saw-tooth shape in cross section, as illustrated in FIGS. 19A and 19B. The optical element LNB includes a first liquid crystal unit B1 rather than the first liquid crystal unit A1 in the first embodiment, and a second liquid crystal unit B2 rather than the second liquid crystal unit A2 in the first embodiment. The first liquid crystal unit B1 includes a liquid crystal layer 53 (also referred to below as a "liquid crystal layer 53A"). The second liquid crystal unit B2 includes a liquid crystal layer 53 (also referred to below as a "liquid crystal layer 53W").

The optical member PM deflects light. That is, the optical member PM refracts a plurality of light rays having a substantially equal incident angle at a substantially equal refracting angle and causes the deflected light rays to exit. The optical member PM is disposed on the first substrate 31. In the above configuration, the optical member PM is opposite to the first liquid crystal unit B1 with the first substrate 31 therebetween. The optical member PM is for example a glass prism having a saw-tooth shape in cross section.

Specifically, the optical member PM includes a plurality of optical elements 84. The optical elements 84 refract light rays at an equal refracting angle. Each of the optical elements 84 refracts for example the light rays LT entering perpendicularly to the optical element LNB at a first refracting angle θF. As a result, the optical member PM deflects light. The first refracting angle θF refers to an angle of light entering the optical elements 84 relative to light exiting from the optical elements 84. The optical elements 84 are arranged side by side substantially in parallel to one another. The optical elements 84 each have a triangular prism shape. Therefore, each of the optical elements 84 has a triangular shape in cross section (e.g., a right triangular shape in cross section).

For example, in a situation in which a wearer HM has a squint eye EY, the eye EY is opposite to one of the second liquid crystal units B2 with a corresponding one of the third substrates 35 therebetween. The optical member PM deflects the light rays LT. The first liquid crystal unit B1 and the second liquid crystal unit B2 each corresponding to the optical member PM deflect the light rays LT deflected by the optical member PM and cause the deflected light rays to exit. The light rays LT then enter the eye EY. The light rays LT can be caused to enter the squint eye EY after being deflected in the sixth embodiment. In the above configuration, the squint eye EY can effortlessly look at an object at which the other emmetropic eye looks. As a result, use of the squint eye EY of the wearer HM can be promoted. Thus, the glasses 1E are effective in correction or improvement of strabismus.

Deflection by the first and second liquid crystal units B1 and B2 is not reflected in a light ray LT illustrated in FIG. 19B for the sake of simplicity of illustration.

The respective liquid crystal layers 53 of the first and second liquid crystal units B1 and B2 deflect light, which is the difference from the respective liquid crystal layers 53 of the first and second liquid crystal units A1 and A2 in the first embodiment which converge or diverge light. That is, each of the liquid crystal layers 53 in the sixth embodiment, which functions as a deflection element, refracts a plurality of light rays having a substantially equal incident angle at a substantially equal refracting angle and then causes the deflected light rays to exit.

In the above configuration, the electric potential gradients formed in the respective liquid crystal layers 53 of the first and second liquid crystal units B1 and B2 are different from those formed in the respective liquid crystal layers 53 of the first and second liquid crystal units A1 and A2.

Figure 19C:
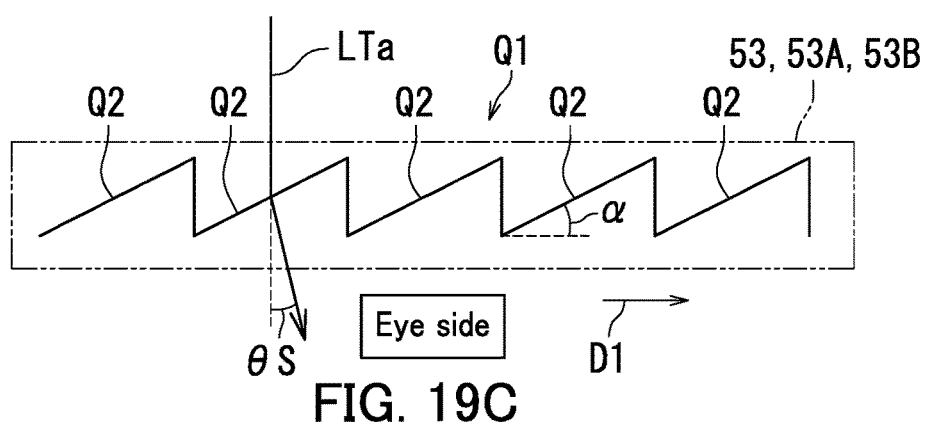
FIG. 19C is a diagram illustrating an electric potential gradient in the liquid crystal layer according to the sixth embodiment.

The following describes an electric potential gradient Q1 formed in each liquid crystal layer 53 in the sixth embodiment with reference to FIGS. 1, 19B, and 19C. FIG. 19C is a diagram illustrating the electric potential gradient Q1 in the liquid crystal layer 53.

As illustrated in FIGS. 1, 19B, and 19C, the control section 17 applies the control voltage CV to the liquid crystal layers 53A and 53B to form an electric potential gradient Q1 in a saw-tooth shape in each of the liquid crystal layers 53A and 53B for control of light refraction (light deflection in the sixth embodiment). The same control voltage CV is applied to the liquid crystal layers 53A and 53B. In the above configuration, the electric potential gradient Q1 formed in the liquid crystal layer 53A and that Q1 formed in the liquid crystal layer 53B are substantially the same as each other similarly to the first embodiment.

Specifically, the electric potential gradient Q1 includes a plurality of electric potential gradients Q2. That is, the electric potential gradients Q2 that are smooth and incline linearly relative to a direction D1 are formed in each liquid crystal layer 53. The "smooth" electric potential gradients Q2 refers to electric potential gradients that are not stepwise.

For the sake of easy understanding, the following describes refraction of a light ray LTa entering perpendicular to the liquid crystal layer 53. As illustrated in FIG. 19C, the liquid crystal layer 53 refracts (specifically, deflects) the light ray LTa at a second refracting angle θS according to a gradient angle α of the electric potential gradients Q2. The second refracting angle θS refers to an angle of a light ray entering the liquid crystal layer 53 relative to a light ray exiting from the liquid crystal layer 53. In the sixth embodiment, the second refracting angle θS is smaller than the first refracting angle θF. Note that the liquid crystal layer 53 refracts (specifically, deflects) light refracted (specifically, deflected) by the optical member PM, and causes the refracted light to exit.

Figure 20:
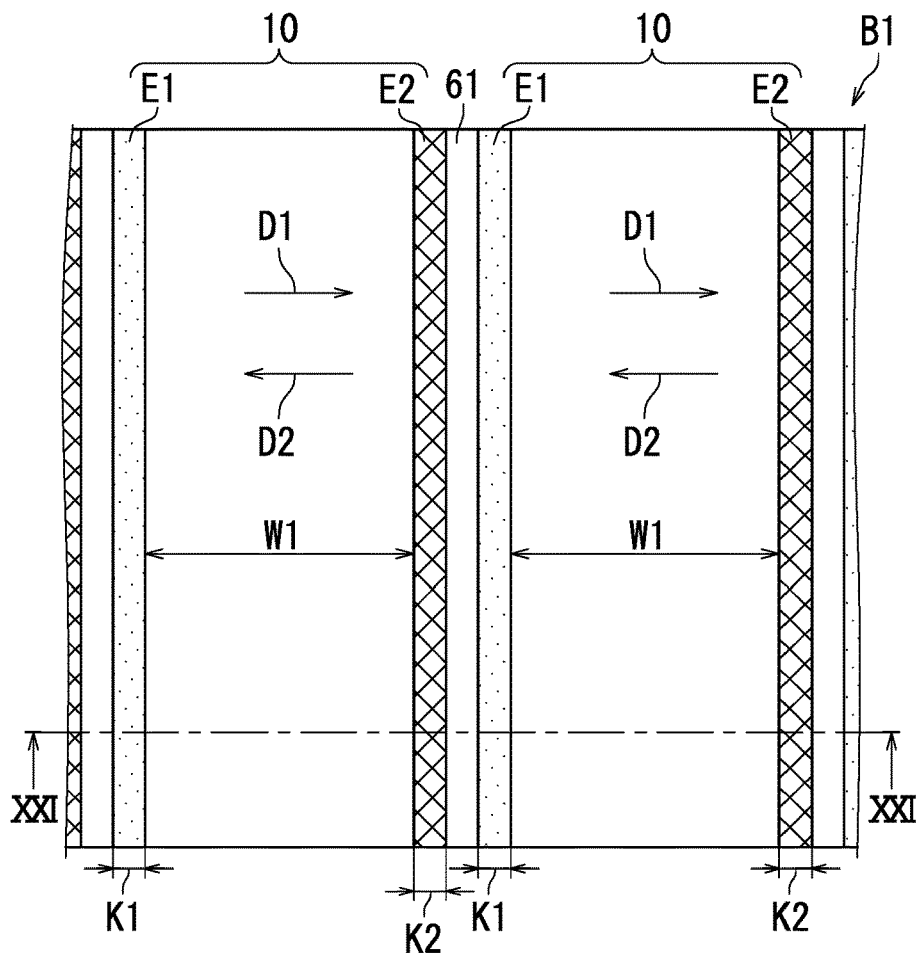
FIG. 20 is a plan view illustrating a first liquid crystal unit according to the sixth embodiment.
Figure 21:
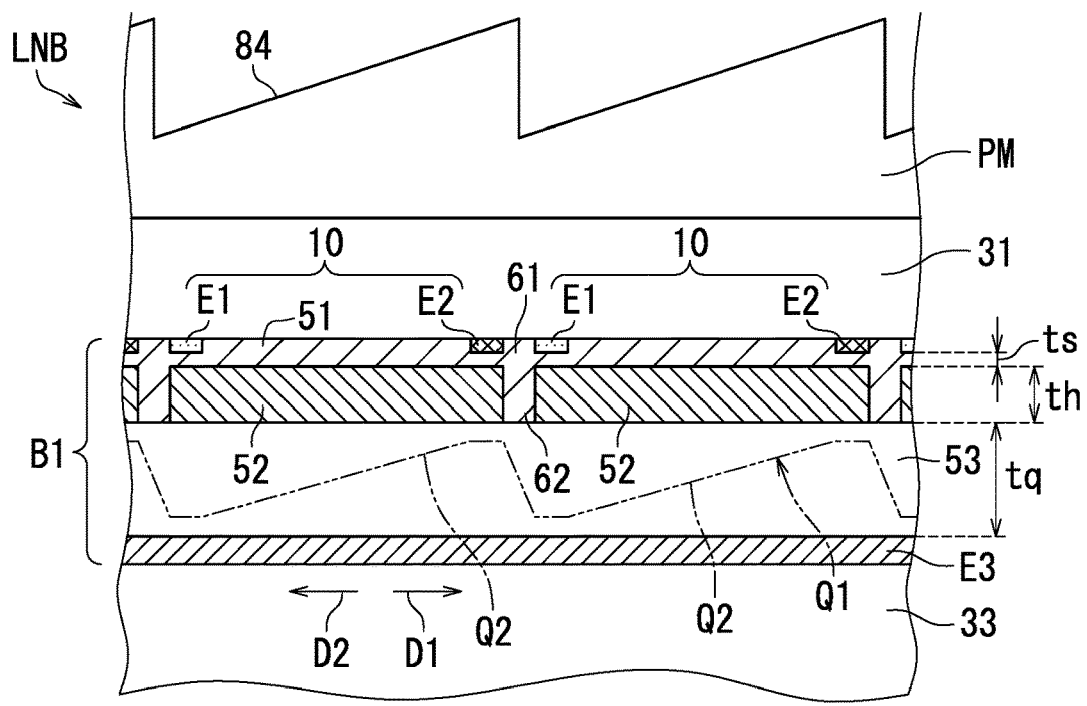
FIG. 21 is a cross-sectional view of the first liquid crystal unit taken along a line XXI-XXI in FIG. 20.

The following describes the first liquid crystal unit B1 with reference to FIGS. 20 and 21. The differences of the first liquid crystal unit B1 from the first liquid crystal unit A1 will be described mainly. Note that the second liquid crystal unit B2 has the same configuration as the first liquid crystal unit B1.

FIG. 20 is a plan view illustrating one of the first liquid crystal units B1. FIG. 21 is a cross-sectional view of the first liquid crystal unit B1 taken along a line XXI-XXI in FIG. 20. For the sake of easy understanding, the optical member PM, the first substrate 31, and the second substrate 33 are illustrated I FIG. 21.

As illustrated in FIGS. 20 and 21, the first liquid crystal unit B1 includes a plurality of electrode units 10, the insulating layer 51, the plurality of first boundary layers 61, the plurality of second boundary layers 62, the plurality of highly resistive layers 52 (resistance layers), the liquid crystal layer 53, and the third electrode E3. The electrode units 10 each include the first electrode E1 and the second electrode E2.

The electrode units 10 extend substantially in parallel to one another. A direction in which the electrode units 10 extend is substantially parallel to a direction in which the optical elements 84 extend. The electrode units 10 are provided in one-to-one correspondence with the optical elements 84, and are each located opposite to a corresponding one of the optical elements 84 with the first substrate 31 therebetween.

The electrode units 10 are located at the same layer level. A second electrode E2 of one of mutually adjacent electrode units 10 is adjacent to a first electrode E1 of the other of the mutually adjacent electrode units 10. The first and second electrodes E1 and E2 extend substantially in parallel to one another.

A first electrode E1 and a second electrode E2 in a pair constitute an electrode unit 10 and are locate at the same layer level. In each of the electrode units 10, the first and second electrodes E1 and E2 are opposite to each other with the insulating layer 51 therebetween and linearly extend side by side with a distance W1 therebetween. The distance W1 between the first and second electrodes E1 and E2 in each electrode unit 10 is larger than a width K1 of the first electrode E1 and a width K2 of the second electrode E2. However, the distance W1 may be set to any value. The distance W1 refers to a distance between an inner periphery of the first electrode E1 and an inner periphery of the second electrode E2. Further, each length of the first electrode E1 and the second electrode E2 may be set to any value.

The width K1 refers to a width of each first electrode E1 in the direction D1. The width K2 refers to a width of each second electrode E2 in the direction D1. The direction D1 is a direction extending from the first electrode E1 toward the second electrode E2, perpendicular to a longitudinal direction of each of the first and second electrodes E1 and E2, and substantially parallel to the liquid crystal layer 53.

The first voltage V1 is applied to the first electrode E1. The second voltage V2 is applied to the second electrode E2. The first voltage V1 and the second voltage V2 may be equal to or different from each other. A third voltage V3 is applied to the third electrode E3. The third electrode E3 is grounded in the sixth embodiment, and therefore, the third voltage v3 is set to the ground potential (0 V). The electrode units 10 are farther from the eye than the liquid crystal layer 53.

The insulating layer 51 has a thickness ts. The thickness ts refers to a thickness of a part of the insulating layer 51 that is located between the first electrode E1 and a corresponding one of the highly resistive layers 52 or a part thereof that is located between the second electrode E2 and a corresponding one of the highly resistive layers 52. The liquid crystal layer 53 is located between each electrode unit 10 and the third electrode E3.

The highly resistive layers 52 have an electric resistivity (specific resistance) higher than those of the first and second electrodes E1 and E2 and lower than that of the insulating layer 51. Each of the highly resistive layers 52 has a thickness th. The thickness ts of the insulating layer 51 is smaller than the thickness th of the highly resistive layer 52. It is more preferable that the thickness is of the insulating layer 51 is smaller as long as insulation between the highly resistive layers 52 and the first and second electrodes E1 and E2 are maintained.

Description of the electric potential gradient Q1 in the liquid crystal layer 53 will be continued with reference to FIG. 21. In FIG. 21, the electric potential gradient Q1 on condition that the first voltage V1 is lower than the second voltage V2 is illustrated. The electric potential gradients Q2 each vary continuously from beneath the first electrode E1 to beneath the second electrode E2 with no extremum value (minimum or maximum value). The potential of a region of the liquid crystal layer 53 that is opposite to each second boundary layer 62 sharply drops.

The optical elements 84 incline at an acute angle relative to the direction D1. When the first voltage V1 is lower than the second voltage V2, each electric potential gradient Q2 inclines at an acute angle relative to the direction D1 along the inclination of the optical elements 84. That is, an inclined direction of the optical elements 84 conforms to an inclined direction of the electric potential gradients Q2. When the first voltage V1 is lower than the second voltage V2, the liquid crystal layer 53 refracts light refracted by the optical member PM toward a site where the optical member PM refracts the light. For the sake of convenience of description, the sign of the second refracting angle θS (see FIG. 19C) in the above case is defined as "positive (plus)". Note that when the first voltage V1 is lower than the second voltage V2, the gradient angle α of the electric potential gradients Q2 (see FIG. 19C) is defined relative to the direction D1.

By contrast, when the first voltage V1 is higher than the second voltage V2, each electric potential gradient Q2 inclines at an acute angle relative to the direction D2. That is, the inclined direction of the optical elements 84 is opposite to the inclined direction of the electric potential gradients Q2. The direction D2 refers to a direction opposite to the direction D1. In the above case, the electric potential gradients Q2 have a shape horizontally flipped from that of the electric potential gradients Q2 illustrated in FIG. 21. When the first voltage V1 is higher than the second voltage V2, the liquid crystal layer 53 refracts light refracted by the optical member PM toward a site opposite to the site where the optical member PM refracts the light. For the sake of convenience of description, the sign of the second refracting angle θS in the above case is defined as "negative (minus)". When the first voltage V1 is higher than the second voltage V2, the gradient angle α of the electric potential gradients Q2 is defined relative to the direction D2.

The gradient angle α of the electric potential gradients Q2 varies according to a difference value DFF (=V1−V2) between the first and second voltages V1 and V2. Specifically, the larger the difference value DFF is, the larger the gradient angel α is and the larger an absolute value of the second refracting angle θS is. When the difference value DFF is 0, the liquid crystal layer 53 loses a function as a deflection element with a result that light entering perpendicular to the liquid crystal layer 53 travels straight. For example, the first refracting angle θF is 15 degrees and the second refracting angle θS is variable in a range from minus 2 degrees to plus 2 degrees under control of the difference value DFF. In the above example, the angle of deflection of the optical element LNB is therefore variable in a range from 13 degrees to 17 degrees.

Moreover, electric potential gradient planes are formed in the liquid crystal layer 53 in the longitudinal directions of the first and second electrodes E1 and E2. The electric potential gradient planes are formed by the respective electric potential gradients G2 that are continuous in the longitudinal directions of the first and second electrodes E1 and E2. Therefore, incident light rays are refracted and caused to exit each at the same second refracting angle θS at any location in the first and second electrodes E1 and E2 in the longitudinal direction thereof.

Figure 22:
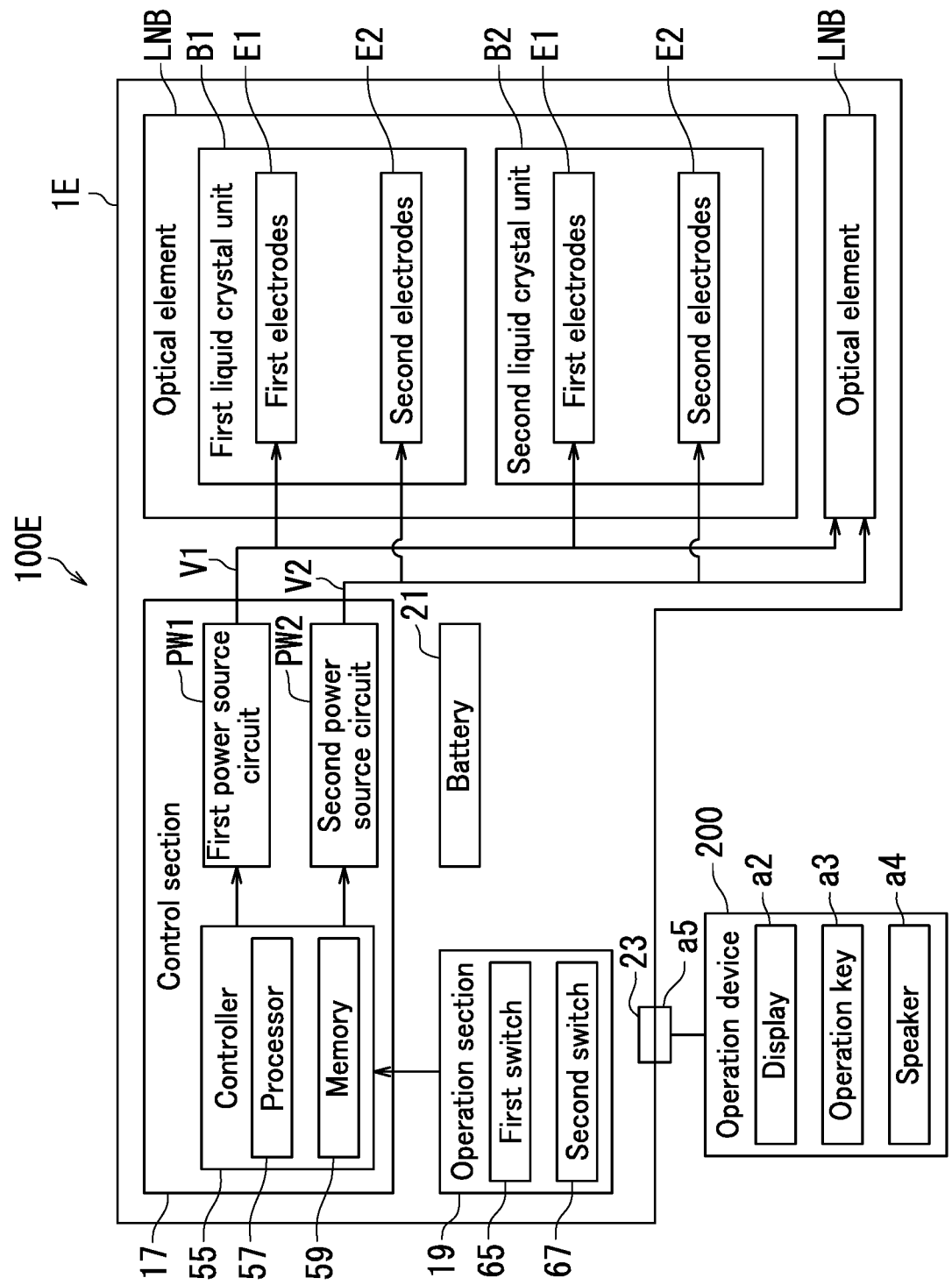
FIG. 22 is a diagram illustrating an electrical configuration of the eyeglass system according to the sixth embodiment.

The following describes operation of the glasses 1E with reference to FIG. 22. FIG. 22 is a diagram illustrating an electrical configuration of the eyeglass system 100E. As illustrated in FIG. 22, the configuration of the glasses 1E is the same as that of the glasses 1 in the first embodiment. However, the glasses 1E includes none of the core electrode 50, the center electrode rc, the first lead wire 71, the second lead wire 72, and the third boundary layer 73 each in the first embodiment.

The first power supply circuit PW1 under control by the controller 55 applies the first voltage V1 to the first electrodes E1 of the first and second liquid crystal units B1 and B2. The first voltage is an example of the control voltage CV.

The second power supply circuit PW2 under control by the controller 55 applies the second voltage V2 to the second electrodes E2 of the first and second liquid crystal units B1 and B2. The second voltage V2 is an example of the control voltage CV.

The controller 55 controls the first and second power supply circuits PW1 and PW2 in response to the internal operation signal from the operation section 19 or the external operation signal from the operation device 200 to control the first and second voltages V1 and V2. The electric potential gradient in each liquid crystal layer 53 can be controlled by controlling the first and second voltages V1 and V2. Specifically, the controller 55 controls the first and second power supply circuits PW1 and PW2 to control the difference value DFF (=V1−V2) between the first and second voltages V1 and V2. The electric potential gradient in the liquid crystal layer 53 can be controlled by controlling the difference value DFF. As a result, the value of the second refracting angle θS can be changed in a range from a negative value to a positive value. The second refracting angle θS can be set to 0 degrees by setting the difference value DFF (specifically, the difference value DV) to 0.

Further specifically, when the controller 55 controls the first and second power supply circuits PW1 and PW2 so that the voltage value v1 of the first voltage V1 is smaller than the voltage value v2 of the second voltage V2, an electric potential gradient Q1 in a saw-tooth shape in cross section is formed in the liquid crystal layer 53. The electric potential gradient Q1 includes a plurality of electric potential gradients Q2 inclining at an acute angle relative to the direction D1.

When the electric potential gradients Q2 inclining at an acute angle relative to the direction D1 are formed, the liquid crystal layer 53 refracts light refracted by the optical member PM toward a site where the optical member PM refracts the light.

By contrast, when the controller 55 controls the first and second power supply circuits PW1 and PW2 so that the voltage value v1 of the first voltage V1 is larger than the voltage value v2 of the second voltage V2, an electric potential gradient Q1 in a saw-tooth shape in cross section is formed in the liquid crystal layer 53. The electric potential gradient Q1 includes a plurality of electric potential gradients Q2 inclining at an acute angle relative to the direction D2.

When the electric potential gradients Q2 inclining at an acute angle relative to the direction D2 are formed, the liquid crystal layer 53 refracts light refracted by the optical member PM toward a site opposite to the site where the optical member PM refracts the light.

The larger the absolute value of the difference value DV (=v1−v2) between the voltage value v1 of the first voltage V1 and the voltage value v2 of the second voltage V2 is, the larger an absolute value of the second refracting angle θS is. When the voltage value v1 is different from the voltage value v2, the larger the absolute value of the difference value DF (=f1−f2) between the frequency f1 of the first voltage V1 and the frequency f2 of the second voltage V2 is, the larger the absolute value of the second refracting angle θS is.

When the controller 55 controls the first and second power supply circuits PW1 and PW2 so that the voltage value v1 is equal to the voltage value v2 and the frequency f1 is equal to the frequency f2, the liquid crystal layer 53 loses a function as a deflection element.

For example, when the wearer HM pushes the first switch 65, the first switch 65 transmits a sixth internal operation signal to the controller 55. Upon receiving the sixth internal operation signal, the controller 55 controls the first and second power supply circuits PW1 and PW2 so as to increase the absolute value of the difference value DFF (e.g., difference value DV). As a result, the absolute value of the second refracting angle θS is increased.

By contrast, for example, when the wearer HM pushes the second switch 67, the second switch 67 transmits a seventh internal operation signal to the controller 55. Upon receiving the seventh internal operation signal, the controller 55 controls the first and second power supply circuits PW1 and PW2 so as to decrease the absolute value of the difference value DFF (e.g., the difference value DV). As a result, the absolute value of the second refracting angle θS is decreased.

As described with reference to FIG. 19B, each optical element LNB includes the optical member PM in the sixth embodiment. In the above configuration, the glasses 1E are useful for correction or improvement of strabismus.

In addition, as described with reference to FIGS. 21 and 22, the electric potential gradient of the liquid crystal layer 53 can be easily controlled by controlling the control voltage CV (specifically, the first and second voltages V1 and V) in the sixth embodiment. Thus, the second refracting angle θS can be easily changed to an angle having any value in a comparatively wide range from a negative value to a positive value under control of the control voltage CV. As a result, in a case where degree of strabismus of the wearer HM is changed (e.g., when strabismus is improved), the second refracting angle θS can be adjusted for the "squint eye after such change" to allow light to enter a "squint eye after the change" without need to replace the optical elements LNB and the glasses 1E.

In addition, the same advantages as in the first embodiment can be provided in sixth embodiment except the functions as a convex lens and a concave lens.

For a patient having a symptom called "nystagmus" in which one of the eyeball shakes, visual power of the patient can be aided and training for treatment can be provided according to the sixth embodiment. Specifically, voltage control is performed to incline incident light in a direction cancelling sight shifting caused due to nystagmus in a manner to follow oscillatory motion of the patient's eyeball according to the frequency of oscillatory motion of the eyeball (e.g., 2 Hz to 3 Hz). Through the above, even when nystagmus appears on a patient, the patient can always recognize an image without shaking, and therefore, support for normal development of eyes can be achieved.

The embodiments and examples of the present invention have been described so far with reference to the drawings (FIGS. 1 to 22). However, the present invention is not limited to the above embodiments and examples and is practicable in various manners within a scope not departing from the gist of the present invention (for example, as described in (1) to (5) below). The drawings schematically illustrate elements of configuration in order to facilitate understanding, and properties of elements of configuration illustrated in the drawings, such as thicknesses, lengths, and the numbers thereof, may differ from actual ones thereof in order to facilitate preparation of the drawings. Furthermore, properties of the elements of configuration described in the above embodiments, such as shapes and dimensions, are merely examples and are not intended as specific limitations. Various alterations may be made so long as there is no substantial deviation from the effects of the present invention.

(1) Any of the features of the eyeglass systems 100 to 100E in the first to sixth embodiments may be optionally combined to constitute an eyeglass system. In one example, the eye detecting sections 75 illustrated in FIG. 10 may be provided in any of the glasses 1B to 1D in the third to fifth embodiments to control the focal lengths according to the respective line-of-sight directions of the wearer HM similarly to the second embodiment. In another example, the optical elements LNA, the operation section 19B, and the environmental light detecting section 77 illustrated in FIG. 14 may be provided in either the glasses 1C or 1D in the fourth or fifth embodiment to control the light transmittance in a similar manner to that in the third embodiment. In still another embodiment, the first and second pressure detecting sections 89 and 95 illustrate in FIG. 6 may be provided in either the glasses 1D or 1E in the fifth or sixth embodiment to detect pressure in a similar manner to that in the fourth embodiment. In yet another example, the control section 17D, the operation section 19D, and the first and second informing sections 97 and 98 illustrated in FIG. 18 may be provided in the glasses 1E in the sixth embodiment and the operation device 200D illustrated in FIG. 18 may be provided in the eyeglass system 100E in the sixth embodiment to provide a function of informing the whereabouts of the glasses 1E or the operation device 200D in a similar manner to that in the fifth embodiment.

For example, the eye detecting sections 75 illustrated in FIG. 10 may be provided in the glasses 1E in the sixth embodiment. In the above case, the control section 17 controls the control voltage CV to the liquid crystal layer 53 based on either or both the line-of-sight direction SLL and the line-of-sight direction SLR for control of the second refracting angle θS. For example, the control section 17 controls the control voltage CV to the liquid crystal layer 53 based on change in either or both the line-of-sight direction SLL and the line-of-sight direction SLR to change the second refracting angle θS.

For example, the first and second liquid crystal units A1 and A2 illustrated in FIG. 2 may be added to the configuration of each optical element LNB illustrated in FIG. 19 to cause the control section 17 to control the focal length of the optical element LNB in a similar manner to that in the first embodiment. In another example, the light transmission unit A3 illustrated in FIG. 13A may be added to the configuration of each optical element LNB illustrated in FIG. 19 to cause the control section 17 to control light transmittance of the optical element LNB in a similar manner to that in the third embodiment. In still another example, the first and second liquid crystal units A1 and A2 illustrated in FIG. 2 and the light transmission unit A3 illustrated in FIG. 13A may be added to the configuration of each optical element LNB illustrated in FIG. 19.

(2) The pair of optical elements LN, the pair of optical elements LNA, and the pair of optical elements LNB are each provided in a corresponding one of the first to sixth embodiments. However, a single optical element LN, a single optical element LNA, and a single optical element LNB may be provided. One of the first and second liquid crystal units A1 and A2 may be dispensed with. One of the first and second liquid crystal units B1 and B2 may be dispensed with. Only one eye detecting section 75 may be provided in the second embodiment. Either the first pressure detecting section 89 or the second pressure detecting sections 95 may be dispensed with in the fourth embodiment. Only one second pressure detecting section 95 may be provided. Either the first informing section 97 or the second informing sections 98 may be dispensed with in the fifth embodiment.

Furthermore, the control voltage CV may be controlled for each optical element LN, each optical element LNA, or each optical element LNB in the first to sixth embodiments.

(3) Each number of the electrode units rn and the electrode units 10 is not particularly limited in the first to sixth embodiments. The control voltage CV may be controlled on an electrode-by-electrode basis for the electrode units rn or the electrode units 10. The control voltage CV may be different among the electrode units rn, the core electrode 50, and the center electrode rc. The core electrode 50 may be dispensed with in the first to fifth embodiments. In particular, in a case where it is not necessary to cause the optical elements LN or LNA to function as a concave lens, the core electrode 50 may be dispensed with. In a configuration in which the core electrode 50 is not provided, the center electrode rc and the electrode units rn are coaxially arranged about the center electrode rc as a center. Furthermore, the first and second lead wires 71 and 72 and the third boundary layer 73 may be dispensed with. In the above case, a plurality of through holes are formed for application of the first and second voltages V1 and V2. In the configuration in which the through holes are formed, the center electrode rc, the first electrodes E1, and the second electrodes E2 are each in an annular shape with no cut.

(4) The insulating layer 51 may be dispensed with in the first to sixth embodiments. The thickness is of the insulating layer 51 may be equal to or larger than the thickness th of the highly resistive layers 52. In the first to sixth embodiments, one of the highly resistive layers 52 is disposed between the liquid crystal layer 53, the core electrode 50, and the center electrode rc and the other highly resistive layers 52 are each disposed between the liquid crystal layer 53 and a corresponding one of the electrode units rn (or electrode units 10). However, it is possible that the core electrode 50 and the center electrode rc are disposed between one of the highly resistive layers 52 and the liquid crystal layer 53 and the electrode units rn (or the electrode units 10) are disposed between the liquid crystal layer 53 and the other highly resistive layers 52.

(5) In the present description and claims, the term linear shape encompasses a substantially linear shape in addition to a linear shape in a strict sense. The term annular shape encompasses a substantially annular shape in addition to an annular shape in a strict sense. The annular shape also encompasses an annular shape a part of which is cut in addition to an annular shape with no cut. The term coaxial shape encompasses a substantially coaxial shape in addition to a coaxial shape in a strict sense. The term sheet-like shape encompasses a substantially sheet-like shape in addition to a sheet-like shape in a strict sense. The term saw-tooth shape encompasses a substantially saw-tooth shape in addition to a saw-tooth in a strict sense. The term band shape encompasses a substantially band shape in addition to a band shape in a strict sense. The term curved shape encompasses a substantially curved shape in addition to a curved shape in a strict sense. The term flat plate shape encompasses a substantially flat plate shape in addition to a flat plate shape in a strict sense. The term disc shape encompasses a substantially disc shape in addition to a disc shape in a strict sense. The term triangular shape encompasses a substantially triangular shape in addition to a triangular shape in a strict sense. The term triangular prism shape encompasses a substantially triangular prism shape in addition to a triangular prism shape in a strict sense.

What is claimed is:

1. Glasses for controlling light that is to enter an eye, comprising:
    an optical element including a first liquid crystal layer that refracts the light; and
    a control section configured to control refraction of the light by forming an electric potential gradient in a saw-tooth shape in the first liquid crystal layer through application of first control voltage to the first liquid crystal layer, wherein
    the optical element includes a plurality of unit electrodes,
    the unit electrodes each include a first electrode and a second electrode to which respective different voltages are applied,
    the first electrode and the second electrode are located on the same layer level,
    the potential gradient in the saw-tooth shape includes plural potential gradients, and
    the plural potential gradients are formed in one-to-one correspondence with the unit electrodes.

2. The glasses according to claim 1, further comprising an eye detecting section configured to detect movement of the eye, wherein
    the control section controls the first control voltage based on a result of detection by the eye detecting section.

3. The glasses according to claim 1, wherein
    the optical element further includes a light transmitting layer capable of controlling light transmittance of the light passing through the light transmitting layer.

4. The glasses according to claim 1, further comprising a pressure detecting section configured to detect pressure.

5. The glasses according to claim 1, further comprising an informing section configured to inform a whereabouts of the glasses in response to a specific signal that is wirelessly transmitted.

6. The glasses according to claim 1, wherein
    the optical element further includes an optical member that has aa saw-tooth shape in cross section and that deflects the light.

7. The glasses according to claim 1, wherein
    unit electrodes among the unit electrodes that are adjacent to each other are differ in width from each other.

8. The glasses according to claim 1, wherein
    the optical element further includes:
        a plurality of resistive layers each disposed for a corresponding one of the unit electrodes, and
    the resistive layers each have a resistivity that is larger than a resistivity of each of the unit electrodes and smaller than a resistivity of an electrical insulator.

9. The glasses according to claim 1, wherein
    the optical element further includes a second liquid crystal layer configured to refract light,
    the second liquid crystal layer faces the first liquid crystal layer,
    the control section applies second voltage to the second liquid crystal layer to form an electric potential gradient in a saw-tooth shape in the second liquid crystal layer,
    liquid crystal of the first liquid crystal layer differs in alignment from liquid crystal of the second liquid crystal layer.

10. The glasses according to claim 2, further comprising a frame configured to support the optical element, wherein
    the eye detecting section is disposed at the frame.

11. The glasses according to claim 3, wherein
    The light transmitting layer faces the first liquid crystal layer, and
    the light transmittance is a ratio of a light quantity of light exiting from the light transmitting layer to a light quantity of light entering the light transmitting layer.

12. The glasses according to claim 3, further comprising:
    a frame configured to support the optical element; and
    an environmental light detecting section disposed at the frame and configured to detect brightness of a surrounding environment of the glasses, wherein
    the control section controls the light transmittance of the light transmitting layer based on a result of detection by the environmental light detecting section.

13. The glasses according to claim 4, further comprising a frame configured to support the optical element, wherein
    the pressure detecting section is disposed at the frame.

14. the glasses according to claim 5, further comprising a frame configured to support the optical element, wherein
    the informing section is disposed at the frame and emits light in response to the specific signal or outputs sound in response to the specific signal.

15. The glasses according to claim 6, wherein
    the optical member is a prism having a saw-tooth shape in cross section and is disposed opposite to the first liquid crystal layer.

16. The glasses according to claim 1, further comprising:
    a frame configured to support the optical element; and
    an operation section disposed at the frame and configured to transmit an operation signal according to operation by a wearer of the glasses to the control section.

* * * * *